(12) United States Patent
Iwase et al.

(10) Patent No.: US 12,033,624 B2
(45) Date of Patent: Jul. 9, 2024

(54) INFORMATION PROCESSING APPARATUS AND INFORMATION PROCESSING METHOD

(71) Applicant: SONY CORPORATION, Tokyo (JP)

(72) Inventors: Hiro Iwase, Tokyo (JP); Kunihito Sawai, Tokyo (JP); Yuhei Taki, Tokyo (JP); Masaki Takase, Tokyo (JP); Akira Miyashita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 536 days.

(21) Appl. No.: 17/250,627

(22) PCT Filed: Jul. 1, 2019

(86) PCT No.: PCT/JP2019/026191
§ 371 (c)(1),
(2) Date: Feb. 12, 2021

(87) PCT Pub. No.: WO2020/039753
PCT Pub. Date: Feb. 27, 2020

(65) Prior Publication Data
US 2021/0304756 A1   Sep. 30, 2021

(30) Foreign Application Priority Data

Aug. 24, 2018 (JP) ................ 2018-157383

(51) Int. Cl.
*G10L 15/22* (2006.01)
*G06F 21/55* (2013.01)
*G10L 15/10* (2006.01)

(52) U.S. Cl.
CPC ............ *G10L 15/22* (2013.01); *G06F 21/554* (2013.01); *G10L 15/10* (2013.01); *G06F 2221/033* (2013.01)

(58) Field of Classification Search
CPC ..... G10L 15/22; G10L 15/10; G10L 15/1706; G10L 25/51; G10L 2015/221;
(Continued)

(56) References Cited

U.S. PATENT DOCUMENTS

2014/0267933 A1* 9/2014 Young ............... H04N 21/43615
348/734
2017/0186428 A1* 6/2017 Kunitake ................ G10L 17/06

FOREIGN PATENT DOCUMENTS

JP   2002-259113 A   9/2002
JP   2004-108604 A   4/2004
(Continued)

OTHER PUBLICATIONS

International Search Report and Written Opinion of PCT Application No. PCT/JP2019/026191, dated Sep. 10, 2019, 08 pages of ISRWO.

*Primary Examiner* — Yogeshkumar Patel
(74) *Attorney, Agent, or Firm* — CHIP LAW GROUP

(57) ABSTRACT

An information processing apparatus includes: a determination unit (250) that, in a case where the determination unit (250) has recognized a user's phrase related to execution of a macro including at least one function execution instruction, determines a degree of security risk of the macro based on at least one of a matching rate, at the time of execution of the macro, of a context indicating a status of the user, or frequency of occurrence of the phrase; and a response control unit (270) that changes control of the execution of the macro based on a determination result of the determination unit (250).

18 Claims, 11 Drawing Sheets

(58) Field of Classification Search
CPC ............ G10L 2015/223; G06F 21/554; G06F 21/6245; G06F 3/167; G06F 2221/033; H04N 21/4394; H04N 21/42203; H04N 21/43615; H04N 21/43637
See application file for complete search history.

(56) References Cited

FOREIGN PATENT DOCUMENTS

| | | | |
|---|---|---|---|
| JP | 2010282273 A | * | 12/2010 |
| JP | 2011-154099 A | | 8/2011 |
| JP | 2017-117371 A | | 6/2017 |

* cited by examiner

| ELEMENT FUNCTION CONSTITUTING MACRO | | | PRECEDING CANCELLATION TARGET OPERATION | | MAXIMUM LOG SEARCH TRACE-BACK TIME $T_r$ | OPERATION CANCELLATION RISK CO-EFFICIENT $k_r$ | REMARKS |
|---|---|---|---|---|---|---|---|
| INTENT [ENTITY] | BEHAVIOR | EXECUTION RISK $R_f$ | INTENT [ENTITY] | BEHAVIOR | | | |
| PlayMusic [A] | PLAY SONG "A" | 1 | PlayMusic [B] | PLAY SONG "B" | 5 MINUTES | 3 | SEARCH FOR TIME FOR ABOUT ONE SONG |
| | | | StopMusic | STOP PLAYING MUSIC | 5 MINUTES | 3 | SAME AS ABOVE |
| SetVolume [15] | SET VOLUME TO 15 | 2 | SetVolume [80] | SET VOLUME TO 80 | | | |
| | | | VolumeUp | TURN UP VOLUME | | | |
| | | | VolumeDown | TURN DOWN VOLUME | | | |
| LightControl [Off] | TURN OFF LIGHT | 2 | LightControl [Small] | TURN DOWN LIGHT | 30 MINUTES | 3 | |
| | | | LightControl [ON] | TURN ON LIGHT | | | |
| Set Temperature [28°] | SET AIR CONDITIONER TO 28 DEGREES | 2 | AirConditioner Control [OFF] | TURN OFF AIR CONDITIONER | 3 HOURS | 3 | |
| | | | SetTemperature [26°] | SET AIR CONDITIONER TO 26 DEGREES | | | |
| SetAlarm [7:30] | SET ALARM AT 7:30 | 3 | SetAlarm [6:00] | SET ALARM AT 6:00 | 24 HOURS | 4 | |

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/026191 filed on Jul. 1, 2019, which claims priority benefit of Japanese Patent Application No. JP 2018-157383 filed in the Japan Patent Office on Aug. 24, 2018. Each of the above-referenced applications is hereby incorporated herein by reference in its entirety.

FIELD

The present disclosure relates to an information processing apparatus and an information processing method.

BACKGROUND

In recent years, devices that can be operated by utterance have become widespread. Along with this trend, many technologies have been proposed to improve the convenience of users who use the above devices. For example, Patent Literature 1 discloses a voice macro processing device that uses voice to achieve execution of an arbitrary operation desired by the user.

CITATION LIST

Patent Literature

Patent Literature 1: JP 2002-259113 A

SUMMARY

Technical Problem

However, in the above-described conventional technique, in a case where a phrase for executing a macro is included in a user conversation or the like, there is a possibility that the macro will be executed at a timing unintended by the user.

Therefore, the present disclosure proposes an information processing apparatus and an information processing method capable of suppressing malfunction without deteriorating the convenience of macro execution by user utterance.

Solution to Problem

In order to solve the above problems, an information processing apparatus according to one embodiment of the present disclosure includes: a determination unit that, in a case where the unit has recognized a user's phrase related to an execution of a macro including at least one function execution instruction, determines a degree of security risk of the macro based on at least one of a matching rate, at the time of execution of the macro, of a context indicating a status of the user, or frequency of occurrence of the phrase; and a response control unit that changes control of the execution of the macro based on a determination result of the determination unit.

Furthermore, an information processing method according to one embodiment of the present disclosure includes executing, by a computer: performing, when the computer has recognized a user's phrase related to an execution of a macro including at least one function execution instruction, determination of a degree of security risk of the macro based on at least one of a matching rate, at the time of execution of the macro, of a context indicating a status of the user, or frequency of occurrence of the phrase; and changing control of the execution of the macro based on a determination result obtained.

BRIEF DESCRIPTION OF DRAWINGS

FIG. 3 is a diagram illustrating a definition example of a macro function cancellation operation.

DESCRIPTION OF EMBODIMENTS

Embodiments of the present disclosure will be described below in detail with reference to the drawings. In each of the following embodiments, the same parts are denoted by the same reference symbols, and a repetitive description thereof will be omitted.

EMBODIMENTS

[Outline of Information Processing Apparatus According to Embodiment]

Figure 1:
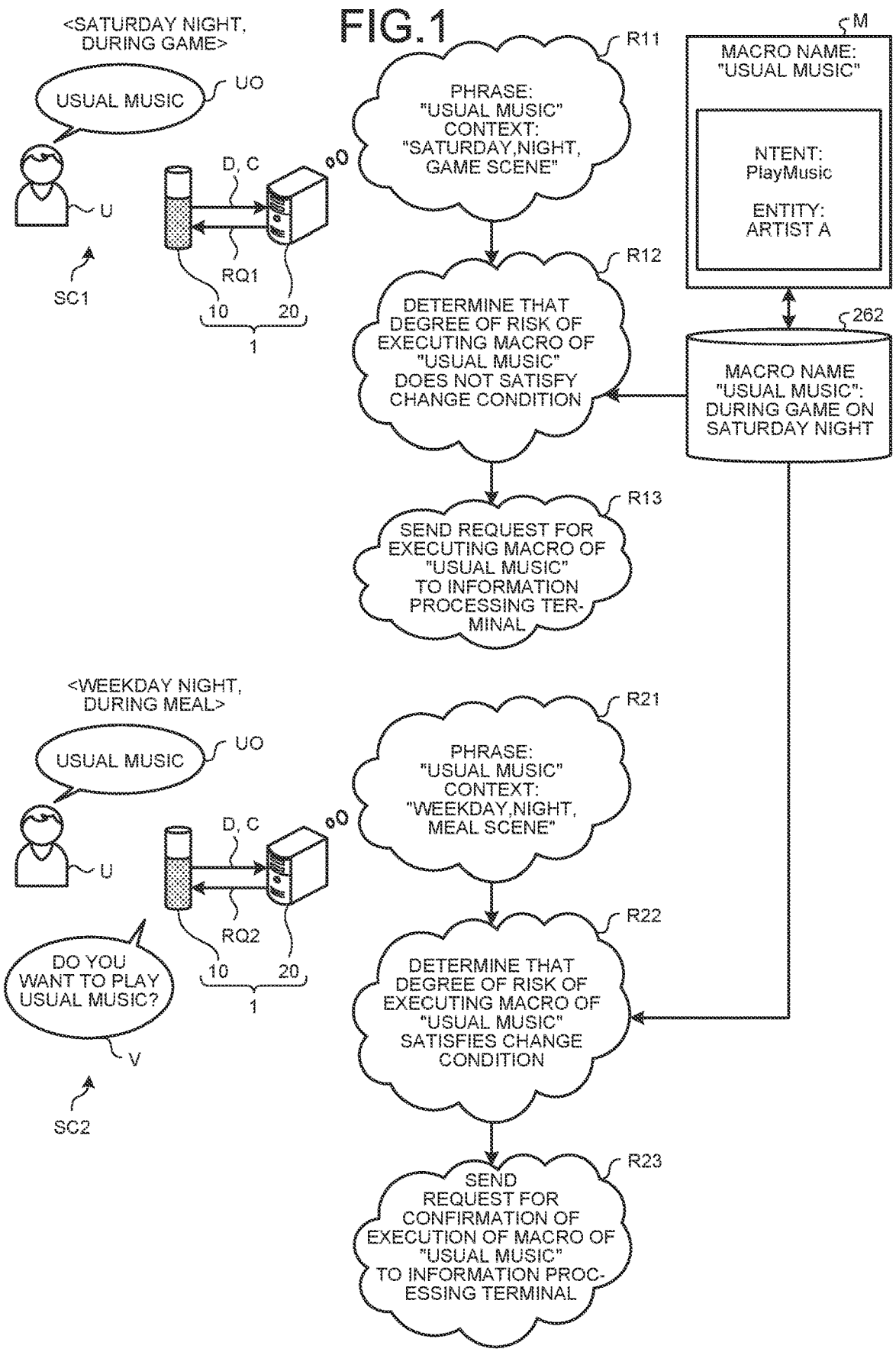
FIG. 1 is a diagram illustrating an outline of information processing according to an embodiment of the present disclosure.

FIG. 1 is a diagram illustrating an outline of information processing according to an embodiment of the present disclosure. Information processing according to an embodiment of the present disclosure is executed by an information processing system 1 illustrated in FIG. 1. As illustrated in FIG. 1, the information processing system 1 includes an information processing terminal 10 and an information processing server 20. The information processing system 1 is an example of the information processing apparatus according to the present disclosure. The information processing terminal 10 and the information processing server 20 have a configuration capable of communicating via a network or directly communicating without a network, for example.

The information processing terminal 10 is also referred to as an Internet of Things (IoT) device, and performs various types of information processing in cooperation with the information processing server 20. The information processing terminal 10 is an example of a user terminal. The information processing terminal 10 is sometimes referred to as an agent device, for example. In addition, voice recognition and voice response processing executed by the information processing terminal 10 are sometimes referred to as agent functions. Examples of the agent devices having agent functions may include a smart speaker, a smartphone, a tablet terminal, a game device, a personal computer (PC), a wearable device, or the like. Furthermore, the information processing terminal 10 according to the present embodiment may be a dedicated terminal of stationary or autonomous mobile types. For example, a smartphone or tablet terminal executes a program (application) having a function similar to the information processing terminal 10 and thereby exerts the above-described agent functions.

In the embodiment, the information processing terminal 10 executes information processing on the collected voice. For example, the information processing terminal 10 recognizes a user utterance and executes information processing on the utterance. For example, the information processing terminal 10 registers a plurality of function execution instructions given by a user using voice, as a macro, and thereafter, the user designates the macro by using voice so as to enable execution of the plurality of functions. The example of FIG. 1 assumes that the information processing terminal 10 is installed at the home where a user U, who is an example of the user of the information processing terminal 10, lives.

For example, the information processing terminal 10 may have various sensors for acquiring various types of other information, in addition to the function of collecting sounds generated in the home. For example, the information processing terminal 10 may include a microphone, and other devices such as a camera for acquiring space, an illuminance sensor for detecting illuminance, a gyro sensor for detecting inclination, an infrared sensor for detecting an object, or the like.

The information processing terminal 10 recognizes an utterance of the user U and performs information processing based on the user utterance. For example, the information processing terminal 10 can execute control of an external device in response to the user utterance. The external device is an electronic device capable of communicating with the information processing terminal 10. Example of external devices include game devices, televisions, air conditioners, lighting devices, audio equipment, or the like. The information processing terminal 10 has a configuration capable of executing control of an external device by outputting a control signal to the external device by wireless communication.

The information processing server 20 illustrated in FIG. 1 is a cloud server, being a server device that executes information processing in cooperation with the information processing terminal 10. The information processing server 20 acquires user utterances collected by the information processing terminal 10, analyzes the acquired user utterances, and executes information processing control corresponding to the analyzed user utterances. The information processing server 20 can request the information processing terminal 10 to execute information processing. For example, the information processing server 20 executes a macro corresponding to the user utterance, or requests the information processing terminal 10 to execute the macro. The macro is, for example, a technique in which one or more function execution instructions are registered as a macro and the macro is called to execute the function. The macro includes a voice macro capable of performing an arbitrary function, operation, or the like for an application, an electronic device, or the like by using voice, for example.

The information processing server 20 manages macro data M indicating a macro related to user U. The macro data M includes data indicating a function to be executed. The example illustrated in FIG. 1 is a case where the macro data M includes one function execution instruction. The macro data M is configured to indicate a plurality of functions to execute and the order of execution. For example, macro data M associates a macro name with an intent (intention) and an entity (object). The intent contains, for example, information indicating a function execution instruction. The entity contains information (for example, parameters) that can be designated in the implementation of the associated intent. The macro data M may associate the name of one macro with a plurality of intents. Macro data M may associate one intent with a plurality of entities.

In the example illustrated in FIG. 1, the macro data M manages macro data M having a macro name "usual music". A macro name triggers the execution of macro data M. The macro data M indicates a function (PlayMusic) of playing music, as an intent. The macro data M indicates an artist A as an entity associated with the intent. That is, the macro data M indicates the execution of a function of playing the music of the artist A.

In scene SC1 of FIG. 1, the user U is performing a user utterance UO during the game on Saturday night. The user utterance UO indicates "usual music", for example. That is, the user utterance UO contains a phrase for executing the macro with the macro name "usual music".

The information processing terminal 10 collects the user utterance UO and acquires a context C indicating a status of the user U at the time of collecting the sound. In this case, the context C includes Saturday, night, game scenes, or the like, for example. The information processing terminal 10 transmits utterance data D indicating the collected user utterance UO, and the context C, to the information processing server 20.

Having received the utterance data D and the context C, the information processing server 20 analyzes the utterance data D. For example, the information processing server 20 performs automatic speech recognition (ASR) processing and natural language understanding (NLU) processing based on a user utterance UO, and extracts a phrase from the utterance data D. As illustrated in state R11, the information processing server 20 extracts "usual music" indicating a macro name, as a phrase, and acquires information such as Saturday, night, and a game scene, as the context C.

The information processing server 20 determines the degree of risk of executing the macro of "usual music". For example, the information processing server 20 compares the history data associated with the macro of "usual music" with the context C, and determines the degree of security risk based on the comparison result. For example, history data 262 indicates that the macro of "usual music" has been executed during the game on Saturday night. As illustrated in state R12, because the current status of the user U is similar to the history and the frequency of phrases is low, the information processing server 20 determines that the degree of security risk of executing the macro does not satisfy a change condition. The change condition is a condition for determining whether it is necessary to change the execution of the macro. The change condition includes a threshold, a range, or the like, for determining a history matching degree, a phrase frequency, or the like. For example, the change condition is a condition for determining a state with a high security risk that requires confirmation of macro execution. In this case, as illustrated in a state R13, the information processing server 20 transmits a request RQ1 for executing the macro of "usual music" to the information processing terminal 10. As a result, the information processing terminal 10 plays the music of artist A.

In scene SC2 of FIG. 1, a user U is performing a user utterance UO during a meal on a weekday night. The user utterance UO indicates "usual music", for example. That is, the user utterance UO contains a phrase for executing the macro with the macro name "usual music".

The information processing terminal 10 collects the user utterance UO and acquires a context C at the time of collecting the sound. In this case, the context C includes, for example, weekdays, nights, meal scenes, or the like. The information processing terminal 10 transmits utterance data D indicating the collected user utterance UO, and the context C, to the information processing server 20.

Having received the utterance data D and the context C, the information processing server 20 analyzes the utterance data D. For example, the information processing server 20 performs automatic speech recognition processing and natural language understanding processing based on the user utterance UO, and extracts a phrase from the utterance data D. As illustrated in state R21, the information processing server 20 extracts "usual music" indicating a macro name, as a phrase, and acquires information such as weekdays, night, and meal scenes, as the context C.

The information processing server 20 determines the degree of risk of executing the macro of "usual music". For example, the information processing server 20 compares the history data associated with the macro of "usual music" with the context C, and determines the degree of security risk based on the comparison result. For example, the history data indicates that the macro of "usual music" has been executed during the game on Saturday night. As illustrated in state R22, because the current status of the user U differs from the history and the frequency of phrases is low, the information processing server 20 determines that the degree of risk of executing the macro satisfies the change condition. Subsequently, as illustrated in state R23, the information processing server 20 transmits a request RQ2 indicating confirmation of execution of the macro of "usual music" to the information processing terminal 10. As a result, the information processing terminal 10 confirms whether to execute the "usual music" macro, to the user U. In the example illustrated in scene SC2, the information processing terminal 10 outputs voice V of "Do you want to play the usual music?" to the user U.

As described above, when the information processing server 20 according to the embodiment has recognized the phrase that triggers the macro execution in the user utterance UO, the information processing server 20 changes the control of macro execution based on the determination result obtained by determining the security risk of executing the macro. With this configuration, the information processing server 20 can change the macro execution control in accordance with the status in which the user U utters the phrase. As a result, the information processing server 20 can suppress malfunctions without deteriorating the convenience of being able to execute macros by voice.

Furthermore, the information processing server 20 controls to execute the macro function execution instruction when the degree of security risk does not satisfy the change condition, and confirms whether to execute the macro to the user U when the degree of security risk satisfies the change condition. With this configuration, the information processing server 20 can change the macro execution method in accordance with the status in which the user U makes the utterance. As a result, the information processing server 20 can suppress the frequency of erroneously executing the macro in response to the utterance of the user U.

Figure 2:
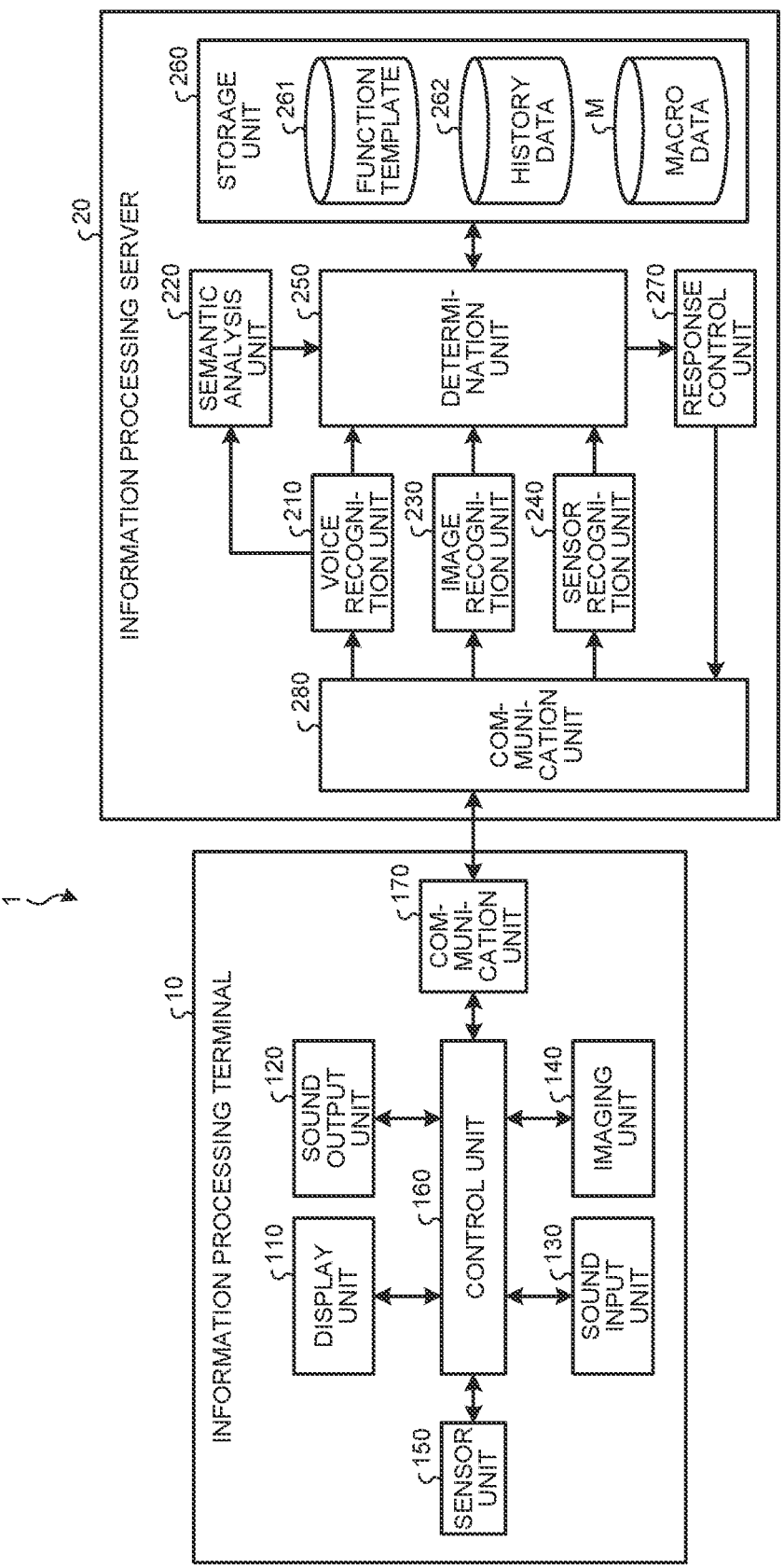
FIG. 2 is a diagram illustrating a configuration example of an information processing system according to an embodiment.

Configuration Example of Information Processing System According to the Present Embodiment Next, as an example of the information processing apparatus according to an embodiment, the configuration of the information processing system 1 including the information processing terminal 10 and the information processing server 20 will be described. FIG. 2 is a diagram illustrating a configuration example of the information processing system 1 according to an embodiment. As illustrated in FIG. 2, the information processing system 1 includes the information processing terminal 10 and the information processing server 20. The information processing apparatus is not limited to the configuration of the information processing system 1.

{Information Processing Terminal 10}

Next, an example of a functional configuration of the information processing terminal 10 according to the present embodiment will be described. As illustrated in FIG. 2, the information processing terminal 10 includes a display unit 110, a sound output unit 120, a sound input unit 130, an imaging unit 140, a sensor unit 150, a control unit 160, and a communication unit 170.

The display unit 110 has a function of outputting visual information such as an image or text. The display unit 110 displays text and/or an image under the control of the information processing server 20.

In the present embodiment, the display unit 110 includes a display device that presents visual information, for example. Examples of the display device include a liquid crystal display (LCD) device, an Organic Light Emitting Diode (OLED) device, and a touch panel. Furthermore, the display unit 110 according to the present embodiment may output visual information by using a projection function.

The sound output unit 120 has a function of outputting various types of sounds including voice. The sound output unit 120 outputs sound under the control of the information processing server 20. In the present embodiment, the sound output unit 120 includes, for example, a sound output device such as a speaker or an amplifier.

The sound input unit 130 has a function of collecting sound information such as utterances by the user U and ambient sounds occurring around the information processing terminal 10. The sound information collected by the sound input unit 130 is used for automatic speech recognition processing by the information processing server 20 and acquisition of context C. In the present embodiment, the sound input unit 130 includes, for example, a microphone for collecting sound information.

The imaging unit 140 has a function of capturing an image of the user U and the surrounding environment. The image information captured by the imaging unit 140 is used by the information processing server 20 for behavior recognition, state recognition, and surrounding environment recognition of the user U. In the present embodiment, the imaging unit 140 includes an imaging device capable of capturing an image. The above image includes a moving image as well as a still image.

The sensor unit 150 has a function of collecting various types of sensor information regarding the surrounding environment, the behavior and the state of the user U. The sensor information collected by the sensor unit 150 is used by the information processing server 20 for recognizing the surrounding environment, recognizing the behavior and the state of the user U. In the present embodiment, the sensor unit 150 is equipped with, for example, an optical sensor including an infrared sensor, an acceleration sensor, a gyro sensor, a geomagnetic sensor, a thermal sensor, a vibration sensor, a Global Navigation Satellite System (GNSS) signal receiving device, or the like.

The control unit 160 has a function of controlling individual configurations included in the information processing terminal 10. The control unit 160 controls the start and stop of individual configurations, for example. Furthermore, the control unit 160 inputs a control signal or the like generated by the information processing server 20 to the display unit 110 or the sound output unit 120. The control unit 160 has a function of executing a macro requested by the information processing server 20. With execution of macros, the control unit 160 functions as an execution unit.

The communication unit 170 has a function of performing information communication with the information processing server 20 via a network. Specifically, the communication unit 170 transmits the sound information collected by the sound input unit 130, the image information captured by the imaging unit 140, and the sensor information collected by the sensor unit 150 to the information processing server 20. Furthermore, the communication unit 170 receives a response output-related control signal or the like from the information processing server 20.

The functional configuration example of the information processing terminal 10 according to the present embodiment has been described as above. The above configuration described with reference to FIG. 2 is merely an example, and the functional configuration of the information processing terminal 10 according to the present embodiment is not limited to such an example. The functional configuration of the information processing terminal 10 according to the present embodiment can be flexibly modified in accordance with specifications and applications.

{Information Processing Server 20}

Next, an example of the configuration of the information processing server 20 will be described. As illustrated in FIG. 2, the information processing server 20 includes a voice recognition unit 210, a semantic analysis unit 220, an image recognition unit 230, a sensor recognition unit 240, a determination unit 250, a storage unit 260, a response control unit 270, and a communication unit 280. Each of the processing units, namely, the voice recognition unit 210, the semantic analysis unit 220, the image recognition unit 230, the sensor recognition unit 240, the determination unit 250, and the response control unit 270 is implemented when programs stored in an information processing server 100 are executed by a CPU or an MPU using RAM or the like as a work area. Furthermore, each processing unit may be implemented by an integrated circuit such as ASIC or FPGA.

The voice recognition unit 210 performs automatic speech recognition processing based on the utterance of the user U collected by the information processing terminal 10. For example, the voice recognition unit 210 can use automatic speech recognition (ASR) processing or the like. The voice recognition unit 210 stores the recognized result in the storage unit 260.

The semantic analysis unit 220 has a function of performing natural language understanding processing on the result of the automatic speech recognition processing by the voice recognition unit 210 and extracting a phrase related to the utterance of the user U. The phrase includes, for example, a phrase included in a macro name, a phrase similar to the macro name, or the like.

The image recognition unit 230 performs various types of recognition processing based on the image captured by the information processing terminal 10. In the present embodiment, the image recognition unit 230 can recognize the state of the user U and the state of the surrounding environment from the above-described image. The result of the recognition processing performed by the image recognition unit 230 is used for the recognition of the context C by the determination unit 250.

The sensor recognition unit 240 performs various types of recognition processing based on the sensor information collected by the information processing terminal 10. In the present embodiment, the sensor recognition unit 240 can recognize the behavior of the user U, the surrounding state, or the like from the above-described sensor information, for example. The result of the recognition processing performed by the sensor recognition unit 240 is used for the recognition of the context C by the determination unit 250.

The determination unit 250 has a function of determining the degree of security risk of the macro based on at least one of a matching rate, at the time of execution of the macro, of the context C indicating the status of the user U, or the frequency of occurrence of the phrase. In a case of having recognized the user U's phrase related to the execution of the macro including at least one function execution instruction, the determination unit 250 determines the degree of security risk of the macro. For example, the determination unit 250 has a function of calculating the frequency of phrases extracted by the semantic analysis unit 220. The determination unit 250 has a function of calculating the phrase frequency based on the past degree of occurrence of the phrase that calls the macro. For example, the determination unit 250 has a function of calculating the matching rate of the acquired context C at the time of execution of the macro. For example, the determination unit 250 has a function of calculating the matching rate between the context C acquired when the user U's phrase related to the execution of the macro is recognized and the context of the user U associated with the macro. The method of calculating the matching rate of context C and the frequency of phrases will be described below.

The determination unit 250 has a function of calculating the degree of disadvantage to the user U by execution of the macro function execution instruction and a function of calculating the degree of macro execution risk based on the degree of the disadvantage. Furthermore, the determination unit 250 has a function of calculating an execution level of the macro. In a case where the execution risk is greater than the execution level, the determination unit 250 controls to execute a process of confirming the execution of the macro to the user.

The determination unit 250 has a function of determining the possibility that execution of the function execution instruction of the macro would cancel the preceding function execution instruction that has been executed. The term "preceding" is used to represent a period within a time range back to the earlier time by a predetermined time. Furthermore, the determination unit 250 has a function of determining the possibility that the execution of the function execution instruction of the macro would cancel the operation executed by the user U. For example, the determination unit 250 has a function of calculating the degree of concentration of the user U on the main task. The main task includes actions and jobs of user U.

The storage unit 260 is implemented by semiconductor memory elements such as random access memory (RAM) and flash drives, or storage devices such as a hard disk or an optical disk. The storage unit 260 stores the utterance data D, the context C, or the like acquired from the information processing terminal 10. The storage unit 260 stores macro data M. The storage unit 260 stores the macro data M associated with the user U. The storage unit 260 stores a function template 261 and the history data 262, for example. The function template 261 includes information indicating a cancellation operation definition for each of function execution instructions of the macro. The history data 262 includes information indicating the execution history of the macro data M executed by the utterance of the user U, information indicating the history of the operations executed by the user U, or the like. The history data 262 may include information identifying the user U who performed execution, the context C indicating the status of executing the macro data M, or the like, as the execution history. The operation of the user U may include, for example, the operation (execution) of the macro by the utterance of the user U.

The response control unit 270 has a function of controlling the response to the user based on the intent and entity extracted by the semantic analysis unit 220, the determination result of the determination unit 250, or the like. The response control unit 270 according to the present embodiment can control the execution of a plurality of functions included in the macro, based on the user's utterance of the name of the registered macro, for example.

The communication unit 280 performs information communication with the information processing terminal 10. The communication unit 280 receives, for example, sound information, images, sensor information, or the like related to the user utterance, from the information processing terminal 10. Furthermore, the communication unit 280 transmits a control signal generated by the response control unit 270, the synthesized voice, the image, or the like, to the information processing terminal 10.

The functional configuration example of the information processing server 20 according to an embodiment of the present disclosure has been described as above. The above configuration described with reference to FIG. 2 is merely an example, and the functional configuration of the information processing server 20 according to the present embodiment is not limited to such an example. The functional configuration of the information processing server 20 according to the present embodiment can be flexibly modified according to specifications and operations.

[Details of Functions of Information Processing Server 20]

Next, functions of the information processing server 20 according to the present embodiment will be described in detail. As described above, the determination unit 250 according to the present embodiment can change the execution control of the macro including a plurality of function execution instructions in accordance with the status of the user U.

For example, the information processing system 1 sometimes recognizes a phrase that is not uttered to the system in a conversation between users U as a voice input for the system. In the present disclosure, this phenomenon is referred to as "false positive recognition". In this case, execution of the macro by the information processing system 1 in response to the phrase unintended by the user U might lead to a possibility of malfunction.

(Execution Risk of Macro Function: $R_f$)

The determination unit 250 of the information processing server 20 has a function of calculating an execution risk $R_f$ of one or more function execution instructions constituting the macro. The determination unit 250 classifies individual functions of the macro according to the degree of disadvantage to the user U due to the execution of the function by the false positive recognition, and defines the $R_f$ accordingly. For example, the determination unit 250 defines the execution risk $R_f$ regarding information provision, content viewing, or the like, having a low degree of disadvantage to the user U, as $R_f=1$. For example, the determination unit 250 defines the execution risk $R_f$ regarding operation of home appliances having a moderate degree of disadvantage to the user, as $R_f=2$. For example, the determination unit 250 defines the execution risk $R_f$ regarding private matters, reservation, or the like, having a high degree of disadvantage to the user, as $R_f=3$. For example, the determination unit 250 defines the execution risk $R_f$ regarding communication, erasure, or the like, having the highest degree of disadvantage to the user, as $R_f=4$. The information processing server 20 can perform setting such that the higher the value of the execution risk $R_f$ becomes, the higher the priority of the processing of confirming the execution of the macro to the user.

The determination unit 250 may update the execution risk $R_f$ of each of functions in accordance with the usage status of the user U. For example, in a case where the user U performs cancellation operation for the function immediately after execution of the macro function, the determination unit 250 may make addition to $R_f$ (for example, +0.1, etc.). For example, in a case where the user U refuses execution of the corresponding function of the macro execution in confirmation of the execution, the determination unit 250 may make addition to $R_f$ regarding the function (for example, +0.1, etc.). For example, in a case where the user U permits execution of the corresponding function of the macro execution in confirmation of the execution, the determination unit 250 may make subtraction to $R_f$ regarding the function (for example, −0.1, etc.).

(Macro Function Operation Cancellation Risk: $U_f$)

The determination unit 250 of the information processing server 20 has a function of determining whether the macro to be executed is an element function of canceling the most recent operation with reference to an operation log of the user U on the history data 262. The most recent operation means, for example, an operation within a time range back to the earlier time by a predetermined time. The element function means, for example, one function execution instruction that constitutes a macro. For example, when the macro to be executed includes an element function of canceling the most recent operation, the determination unit 250 adds a value obtained by multiplying an operation cancellation risk $U_f$ by a coefficient to the execution risk of the function indicated by the function execution instruction. For example, the operation cancellation risk $U_f$ is expressed by the following Formula (1).

$$U_f = (1 - t/T_f) \qquad \text{Formula (1)}$$

Here, $T_f$ in Formula (1) indicates a maximum value of the log search time for a cancellation target operation back to the earlier time from the time of macro execution, and the value $T_f$ is defined for each of functions. The symbol t in Formula (1) indicates the time from the cancellation target operation until the execution of the macro, and this t is in the range: $0 < t \leq T_f$.

As illustrated in the following Formula (2), the determination unit 250 adds a value obtained by multiplying the operation cancellation risk $U_f$ by a coefficient $K_f$ to the execution risk $R_f$, and defines this value as the execution risk $R_f$. Here, the coefficient $K_f$ is a coefficient defined by the degree of disadvantage to the user U by operation cancellation for each of functions.

$$R_f += K_f U_f \qquad \text{Formula (2)}$$

The operation cancellation risk $U_f$ (sum) of each of macro functions can also be used to calculate a context matching rate $M_c$, which will be described below. For example, the more the number of functions with high operation cancellation risk $U_f$, the lower the context matching rate $M_c$ becomes. This result in an increase of a security risk $R_m$ of the macro, leading to the higher probability that the execution confirmation step will be executed. Furthermore, the increase of the execution risk $R_f$ of the element function that cancels the most recent operation in the macro to be executed leads to the higher probability of performing the confirmation or delayed execution of the element function that cancels the most recent operation during macro execution.

The information processing server 20 stores information indicating a cancellation operation definition for each of macro functions in the function template 261. FIG. 3 is a diagram illustrating a definition example of a macro function cancellation operation. In the example illustrated in FIG. 3, the function template 261 includes items such as Element functions constituting macro, Preceding cancellation target operation, Maximum log search trace-back time $T_f$, Operation cancellation risk coefficient $K_f$, and Remarks. The item of Element functions constituting macro further includes items such as Intent [entity], Behavior, and Execution risk $R_f$. The item of Preceding cancellation target operation further includes items of Intent [entity] and Behavior.

For example, in the Element functions constituting macro, "Play Music [A]" is set in the item of Intent [entity], "Play song "A"" is set in the item of Behavior, and "1" is set in the item of Execution risk $R_f$. In addition, in the items such as Preceding cancellation target operation, Maximum log search trace-back time $T_f$, Operation cancellation risk coefficient $K_f$, and Remarks, which are associated with Element functions constituting macro, the following pieces of information are set. Regarding Preceding cancellation target operation, operations of "PlayMusic [B] and StopMusic" are set in the item of Intent [entity], and "Play song "B" and Stop playing music" are set in the item of Behavior. Regarding the item of maximum log search trace-back time $T_f$, the time "5 minutes" is set. Regarding the item of the operation cancellation risk coefficient $K_f$, the number "3" is set. In item of Remarks, "Search for time for about one song" is set.

In a case where the macro function is a function of playing song "A", the information processing server 20 sets Maximum log search trace-back time $T_f$ to 5 minutes, and searches whether a function of playing song "B" has been executed most recently, as the preceding cancellation target operation. In a case where the information processing server 20 has found that the function of playing song "B" has been executed, the information processing server 20 sets Operation cancellation risk coefficient $K_f$ to "3" because the playback of song "A" would stop the playback of song "B". In this manner, the information processing server 20 is capable of obtaining the operation cancellation risk coefficient $K_f$ with reference to the function template 261 even for the other element functions of the macro.

(Context Matching Rate: $M_c$)

The determination unit 250 of the information processing server 20 has a function of calculating the context matching rate $M_c$. For example, the determination unit 250 calculates the context matching rate $M_c$ using the following Formula (3).

$$M_c = \frac{\sum_{j=1}^{n}(W_j \cdot P(C_{jobs}|S))}{\sum_{i=1}^{n} W_j + \sum_i U_{fi}} Fo \qquad \text{Formula (3)}$$

Here, n in Formula (3) is the number of context types $C_j$ as observation targets. In Formula (3), $P(C_{jobs}|S)$ is the observation probability on the log of a current observation context $C_{jobs}$ under the execution condition of a macro complex function sequence S. In Formula (3), $W_j$ is a weighting factor of the context type $C_j$ used for the weighted average, and it changes depending on the degree of dependence of the macro complex function sequence S on the context type $C_j$. For example, $W_j$ can be determined by using $W_j = P(C_{jmax}|S)$. $C_{jmax}$ is argmaxP $(C_j|S)$, indicating the context having the maximum observation probability on the log under the execution condition of the macro complex function sequence S within the context type $C_j$. Note that $U_f$ indicates the most recent operation cancellation risk of each of Macro's element functions as constituents, and is calculated as described above.

An example of the context type $C_j$ will be described. The context type $C_j$ includes, for example, types such as day of the week (date and time), time zone (date and time), scene, user behavior, location, user U's emotion, and dialogue context. The day of the week (date and time) includes, Sunday, Monday, Tuesday, Wednesday, Thursday, Friday, and Saturday, for example. The time zone includes morning, noon, evening, night, and midnight, for example. The scene includes a game scene. The game scene may include information such as a game title and a player. User behavior includes cooking, eating, watching television, running a particular application, talking, for example. The location includes, for example, a living room, a bedroom, a kitchen, or a place name on a map in a virtual space in a game or the like. User U's emotions include, for example, happy, sad, fun, angry, surprised, and normal. The dialogue context includes, for example, the most recent user utterance, intent, or the like.

(Phrase Frequency: $F_p$)

The determination unit 250 of the information processing server 20 has a function of setting a phrase frequency $F_p$ during the macro call. The determination unit 250 sets a frequency f in N stages (for example, 10 stages) from the degree of occurrence of a phrase on the data such as a dialogue corpus at the time of macro registration. For example, the determination unit 250 can calculate the phrase frequency $F_p$ by dividing the frequency f by N stages, as illustrated in the following Formula (4). Note that the frequency f satisfies the relationship of $1 \leq f \leq N$.

$$F_p = f/N \qquad \text{Formula (4)}$$

Furthermore, the determination unit 250 can perform individualized update of the phrase frequency $F_p$. For example, when the phrase is used during execution of the macro, the determination unit 250 can add 1 only to the denominator of Formula (4). In this case, the phrase frequency $F_p'$ can be calculated by dividing the phrase frequency f by (N+1) stages. For example, the determination unit 250 can monitor free utterances such as the message content of user U and user utterances during a call or the like. When the phrase is used in a situation other than macro execution, the determination unit 250 can add 1 to both the denominator and the numerator of Formula (4). In this case, the phrase frequency $F_p'$ can be calculated by dividing the phrase frequency (f+1) by (N+1) stages. For example, when an undo operation of the macro is performed after the phrase is used for macro execution, the determination unit 250 can add 1 only to the numerator of Formula (4). In this case, the phrase frequency $F_p'$ can be calculated by dividing the phrase frequency (f+1) by N stages. However, since 1 has been added to the denominator of Formula (4) when the macro is executed, the phrase frequency $F_p'$ would not exceed 1.

(Macro Security Risk: $R_m$)

The determination unit 250 of the information processing server 20 has a function of calculating the security risk $R_m$ of the macro. The determination unit 250 calculates the security risk $R_m$ based on the context matching rate $M_c$ and the phrase frequency $F_p$. For example, the determination unit 250 can calculate the security risk $R_m$ by multiplying the value obtained by subtracting the context matching rate $M_c$ from 1 by the phrase frequency $F_p$, as illustrated in the following Formula (5).

$$R_m = (1 - M_c) \cdot F_p \qquad \text{Formula (5)}$$

The context matching rate $M_c$ is in the range of: $0 \leq M_c \leq 1$. In this case, in Formula (5), the higher the matching between the various contexts C observed during macro execution and the various contexts when the macro complex function was performed in the past on the user operation log, the higher the context matching rate $M_c$ becomes, leading to the lower security risk $R_m$. Moreover, in Formula (5), the more the difference in the utterance status between the various contexts at execution and the various contexts in the past, the lower the context matching rate $M_c$ becomes, leading to the lower security risk $R_m$.

The phrase frequency $F_p$ is in the range of: $0 < F_p \leq 1$. In this case, in Formula (5), the less probable the macro call phrase is to be used for purposes other than macro calling, the lower the phrase frequency $F_p$ becomes, leading to the lower security risk $R_m$. In contrast, in Formula (5), the more probable the phrase is to be used on a daily basis other than for macro calling, the higher the phrase frequency $F_p$ would be, leading to the higher security risk $R_m$.

The security risk $R_m$ calculated by Formula (5) can be in the range of $0 \leq R_m \leq 1$. The security risk $R_m$ is obtained by multiplication. Therefore, when the phrase frequency $F_p$ is low, that is, when the phrase cannot be used for any occasion other than macro calling, the security risk $R_m$ would be low, even when the context matching rate $M_c$ is low. Note that the case where the context matching rate $M_c$ is low can, in other words, be the case where the utterance statuses are significantly different and thus, the risk is high. Moreover, even when the phrase frequency $F_p$ is low, the macro security risk $R_m$ would be low when the context matching rate $M_c$ is high. The case where the phrase frequency $F_p$ is low is, in other words, a case where the phrase is used on a daily basis, and thus the risk is high.

(Macro Execution Level: $L_e$)

The determination unit 250 of the information processing server 20 has a function of calculating a macro execution level $L_e$. The determination unit 250 calculates the execution level $L_e$ based on the security risk $R_m$. For example, the determination unit 250 can calculate the execution level $L_e$ of the macro by multiplying the value obtained by subtracting 1 from the security risk $R_m$ by an execution level coefficient $k_1$, as illustrated in the following Formula (6).

$$L_e = -k_1 \cdot (R_m - 1) \qquad \text{Formula (6)}$$

The execution level coefficient $k_1$ is set to the value of the execution risk $R_f$ of the element function for which execution confirmation or delay is performed when $R_m = 0$, for example. Note that $R_m = 0$ indicates a state where there is no security risk in the macro.

Figure 4:
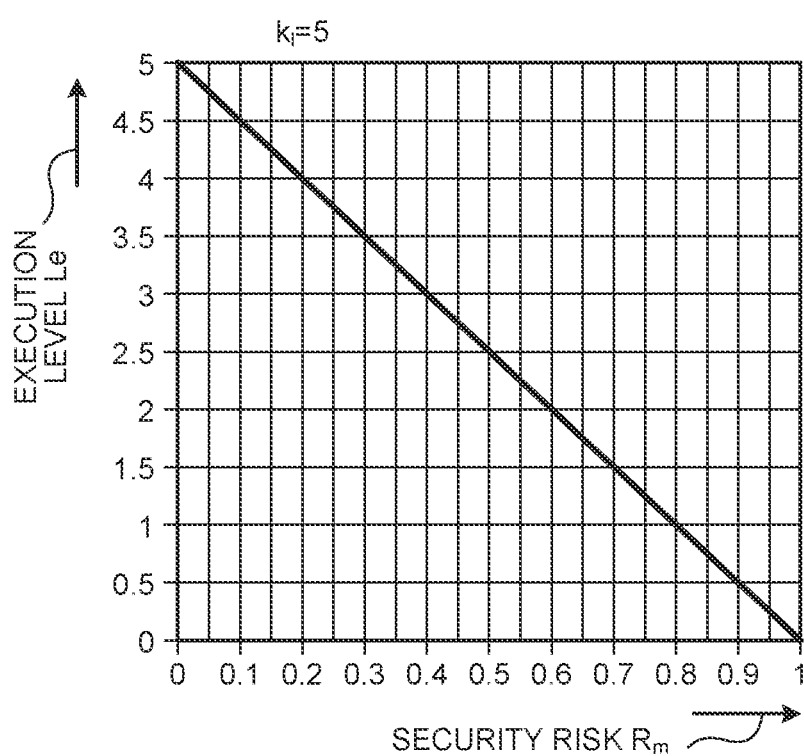
FIG. 4 is a diagram illustrating an example of a relationship between the security risk and an execution level according to the present embodiment.

FIG. 4 is a diagram illustrating an example of a relationship between the security risk $R_m$ and the execution level $L_e$ according to the present embodiment. In FIG. 4, the horizontal axis indicates the security risk $R_m$ and the vertical axis indicates the execution level $L_e$. FIG. 4 illustrates a graph when the execution level coefficient $k_1$ is 5. The graph illustrated in FIG. 4 is a graph in which the execution level $L_e$ is 5 when the security risk $R_m$ is 0, and the execution level $L_e$ is 0 when the security risk $R_m$ is 1.

The determination unit 250 of the information processing server 20 has a function of changing the risk handling method according to a multitasking degree of the user U. The multitasking degree means the degree of concentration of the user U on the main task, for example.

For example, when the controller operation frequency of the game machine of the user U is high, the determination unit 250 determines that the multitasking degree is high because there is a high possibility that the user U is making the utterance while playing the game. When the power of the television is turned off, for example, the determination unit 250 determines that the multitasking degree, indicating the state of performing the task while watching the television, is low. When the television is turned on and the line of sight of the user U is facing the television, for example, the determination unit 250 determines that the multitasking degree, indicating the state of performing the task while watching the television, is high. The determination unit 250 determines from the image information that the greater the movement of the user U, the higher the multitasking degree. In the present embodiment, the multitasking degree is the quantification of the degree of concentration of the user U on the main task.

In a case where the multitasking degree is a determination threshold or below (lower), the determination unit 250 confirms to the user U whether to execute the element function of the macro. In a case where a response of permission is received from the user U, the determination unit 250 determines that the macro element function is to be executed. In a case where a response of execution refusal is received or no response of permission is received from the user U, the determination unit 250 determines that the macro element function is not to be executed.

In a case where there is a response of change for the confirmed macro element function from the user U, the determination unit 250 may change or invalidate the macro element function. Here is an exemplary case where the determination unit 250 confirms to the user U "Is it OK to set the volume to 80?". When the determination unit 250 receives a response from the user U that "Change the volume to 50", the determination unit 250 may change the volume of the element function of the macro to 50.

In a case where the multitasking degree is greater than the determination threshold, the determination unit 250 delays the execution of the element function of the macro. For example, the determination unit 250 performs setting such that the higher the multitasking degree, the longer the delay time until the execution of the element function of the macro. The determination unit 250 may monitor the user U's multitasking degree during the delay period. In a case where the multitasking degree becomes the determination threshold or less, the determination unit 250 may confirm whether to execute the element function to the user U. Furthermore, when an instruction to cancel the element function is received from the user U during the delay time of the element function, the determination unit 250 will execute the processing of the next element function without executing the current element function. When the delay time elapses without receiving an element function cancellation instruction from the user U, the determination unit 250 will execute the current element function.

Incidentally, in cases where there is a user other than the user U who uttered the macro call phrase, or where the user U is during live distribution in the game, or the like, at the time of performing execution confirmation or delay of the element function, the determination unit 250 may suppress presentation of executed content related to personal matter, such as details of the message.

[Procedure of Information Processing Related to Macro Security Risk]

Figure 5:
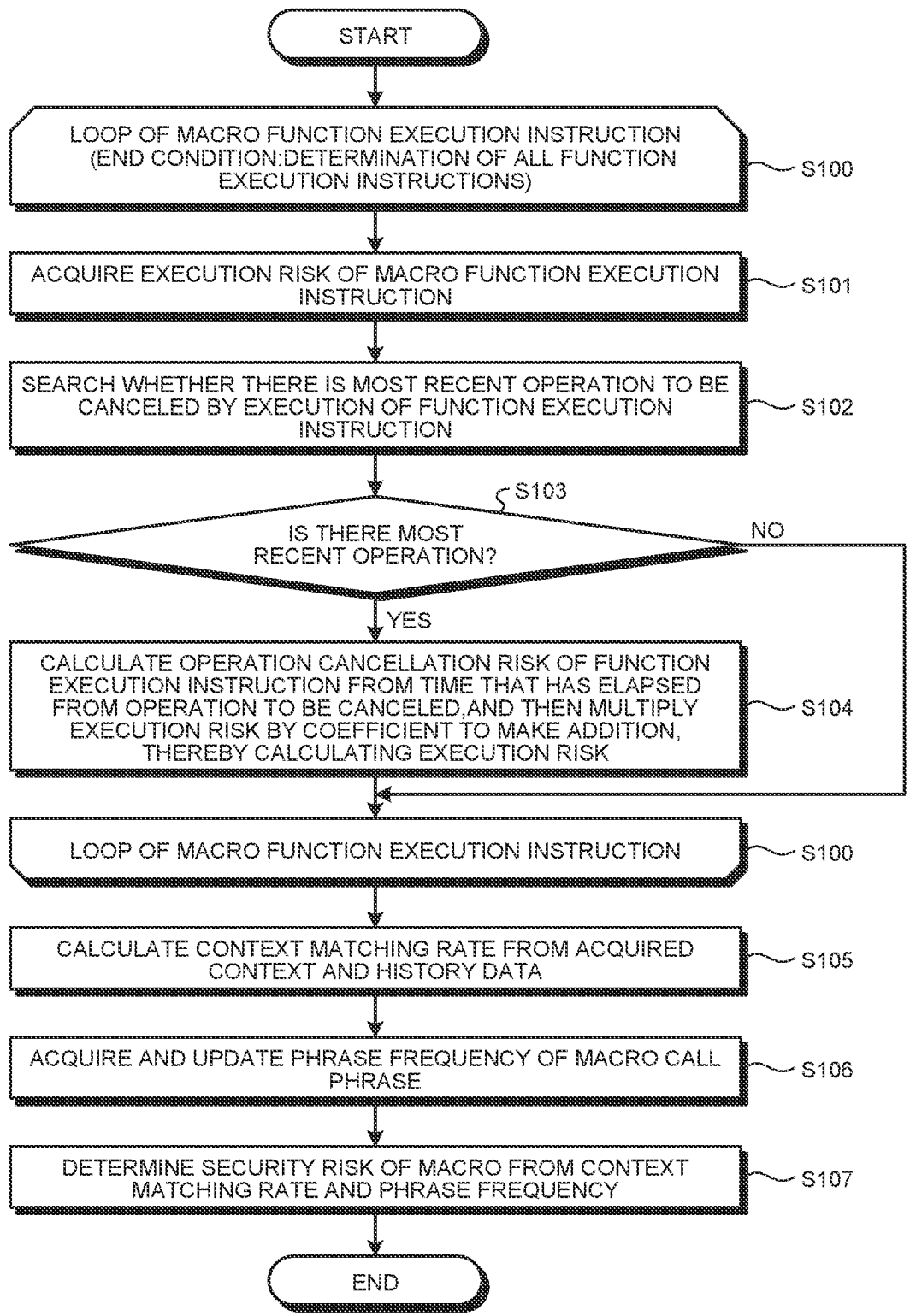
FIG. 5 is a flowchart illustrating an example of a procedure of information processing related to macro security risk.

Next, a procedure of information processing related to macro security risk will be described with reference to FIG. 5. FIG. 5 is a flowchart illustrating an example of a procedure of information processing related to macro security risk. The processing procedure illustrated in FIG. 5 is actualized by execution of a program by the information processing server 20. The processing procedure illustrated in FIG. 5 is executed when the information processing server 20 detects a trigger to execute the macro. In other words, the processing procedure illustrated in FIG. 5 will be executed when the macro call phrase is recognized from the utterance of the user U. The processing procedure illustrated in FIG. 5 is an example of the processing procedure performed by the determination unit 250.

As illustrated in FIG. 5, with the execution of a program, the information processing server 20 executes a loop process of Step S100 of the macro function execution instruction. The end condition of this Step S100 is determination of all the function execution instructions constituting the macro. After executing Step S100, the information processing server 20 acquires the execution risk $R_f$ of the macro function execution instruction (Step S101). The process of Step S101 corresponds to the function of calculating the execution risk $R_f$ of the above macro function. Based on the function template 261, the information processing server 20 searches for the most recent operation to be canceled by the execution of the function execution instruction (Step S102). The process of Step S102 corresponds to the process of calculating the operation cancellation risk $U_f$ of the above macro function.

The information processing server 20 determines whether there is the most recent operation to be canceled (Step S103). For example, when the information processing server 20 detects the most recent operation to be canceled, the server determines that there is the most recent operation. In a case where the information processing server 20 determines that there is no most recent operation (No in Step S103), the information processing server 20 returns the process to the loop process in Step S100. Furthermore, when the information processing server 20 determines that there is the most recent operation (Yes in Step S103), the information processing server 20 proceeds to the process in Step S104.

The information processing server 20 calculates the operation cancellation risk $U_f$ of the function execution instruction from the time t that has elapsed from the operation to be canceled, and then multiplies the execution risk $R_f$ by a coefficient to make addition, thereby calculating the execution risk $R_f$ (Step S104). The process of Step S104 corresponds to the process of changing the execution risk $R_f$ based on the operation cancellation risk $U_f$ of the above macro function. Having obtained the execution risk $R_f$, the information processing server 20 returns the process to the loop process in Step S100. In a case where the information processing server 20 has not determined all the function execution instructions of the macro, the information processing server 20 repeats the loop process. In a case where the information processing server 20 determines all the function execution instructions of the macro, the information processing server 20 ends the loop process in Step S100 and proceeds to the process in Step S105.

The information processing server 20 calculates the context matching rate $M_c$ from the acquired context and the history data 262 (Step S105). The process of Step S105 corresponds to the above-described function of calculating the context matching rate $M_c$. Subsequently, the information processing server 20 acquires and updates the phrase frequency $F_p$ of the macro call phrase (Step S106). The process of Step S106 corresponds to the function of setting the phrase frequency $F_p$. Subsequently, the information processing server 20 determines (calculates) the security risk $R_m$ of the macro from the context matching rate $M_c$ and the phrase frequency $F_p$ (Step S107). The process of Step S107 corresponds to the function of calculating the security risk $R_m$ of the macro. The information processing server 20 then stores the security risk $R_m$ in the storage unit 260 to end the processing procedure illustrated in FIG. 5.

As described above, the information processing server 20 calculates the matching rate between the context C acquired when the user's phrase related to the execution of the macro is recognized and the context of the user U associated with the macro. With this operation, the information processing server 20 can determine whether the user intends to execute the macro from the status of the user U and the phrase. As a result, the information processing server 20 can make a determination suitable for the status of the user U, making it possible to suppress erroneous execution of the macro.

[Procedure of Information Processing Related to Macro Execution Control]

Figure 6:
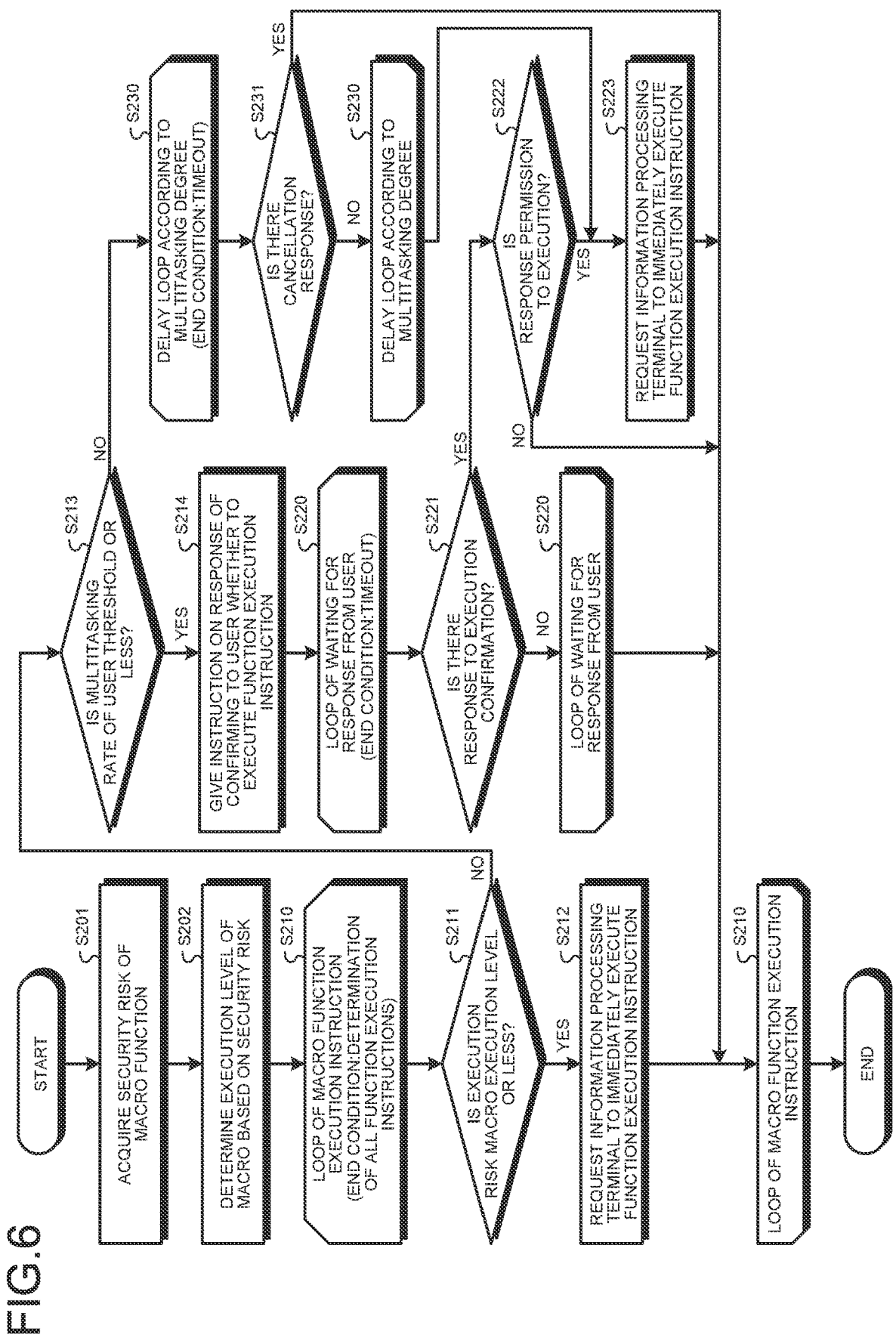
FIG. 6 is a flowchart illustrating an example of a procedure of information processing related to macro execution control.

Next, a procedure of information processing related to macro execution control will be described with reference to FIG. 6. FIG. 6 is a flowchart illustrating an example of the information processing procedure related to macro execution control. The processing procedure illustrated in FIG. 6 is actualized by execution of a program by the information processing server 20. The processing procedure illustrated in FIG. 6 is executed after completion of the processing procedure illustrated in FIG. 5.

As illustrated in FIG. 6, the information processing server 20 acquires the security risk $R_m$ of the macro (Step S201). The information processing server 20 acquires the security risk $R_m$ of the macro determined by the processing procedure illustrated in FIG. 5. Subsequently, the information processing server 20 determines (calculates) the execution level $L_e$ from the security risk $R_m$ of the macro (Step S202). The process of Step S202 corresponds to the function of calculating the macro execution level $L_e$.

The information processing server 20 executes a loop process of the macro function execution instruction (Step S210). The end condition of this Step S210 is determination of all the function execution instructions constituting the macro. After executing the loop process in Step S210, the information processing server 20 determines whether the execution risk $R_f$ of the function execution instruction constituting the macro is the execution level $L_e$ or less (Step S211). In a case where the information processing server 20 determines that the execution risk $R_f$ is the execution level $L_e$ or less (Yes in Step S211), the information processing server 20 proceeds to the process in Step S212. The information processing server 20 requests the information processing terminal 10 to immediately execute the function execution instruction (Step S212). The immediate execution of the function execution instruction includes, for example, execution of the function execution instruction, execution of the function execution instruction without confirmation from the user U, or the like. For example, the information processing server 20 requests the information processing terminal 10 to immediately execute a macro function execution instruction by the response control unit 270. After having requested immediate execution, the information processing server 20 returns the process to the loop process in Step S210. As a result, the information processing terminal 10 executes a macro function execution instruction by the control unit 160. When the determination for all the function execution instructions of the macro is not completed, the information processing server 20 repeats the loop process of Step S210 for the other function execution instructions. When the determination for all the function execution instructions of the macro is completed, the information processing server 20 ends the loop process in Step S210 so as to end the processing procedure illustrated in FIG. 6.

In a case where the information processing server 20 determines that the execution risk $R_f$ of the function execution instruction constituting the macro is not the execution level $L_e$ or less (No in Step S211), the information processing server 20 proceeds to the process in Step S213. The information processing server 20 determines whether the multitasking degree of the user U is the determination threshold or less (Step S213). For example, the information processing server 20 obtains the multitasking degree of the user U based on the context C, and determines whether the multitasking degree is a determination threshold or less. In a case where the information processing server 20 determines that the multitasking degree of the user U is the determination threshold or less (Yes in Step S213), the information processing server 20 proceeds to the process in Step S214. The series of processes from Step S214 after Yes in Step S213 is an example of the process of making a confirmation to the user U whether to execute the element function of the macro in a case where the multitasking degree is the determination threshold or less (lower).

The information processing server 20 gives an instruction on a response of confirming to the user U whether to execute the macro function execution instruction (Step S214). For example, the information processing server 20 instructs the information processing terminal 10 to perform a response of making a confirmation to the user U via the response control unit 270. As a result, the information processing terminal 10 notifies the user U of a message confirming the execution of the macro function execution instruction by execution of the control unit 160. In a case where the information processing terminal 10 receives execution confirmation, cancellation, or the like, the information processing terminal 10 transmits a response to the information processing server 20.

After giving the instruction on the response, the information processing server 20 executes a loop process of waiting for the response from the user U (Step S220). The end condition of this Step S220 is a timer timeout. After executing Step S220, the information processing server 20 determines whether there is a response to the execution confirmation from the user U (Step S221). For example, in a case where the information processing server 20 has received a response from the information processing terminal 10 via the communication unit 280, the information processing server 20 determines that there is a response to the execution confirmation.

In a case where the information processing server 20 determines that there is a response to the execution confirmation from the user U (Yes in Step S221), the information processing server 20 proceeds to the process in Step S222. The information processing server 20 determines whether the response is permission to execution (Step S222). In a case where the information processing server 20 determines that the response is not permission to execution (No in Step S222), the information processing server 20 ends the loop process in Step S220 and returns the process to the loop process in Step S210. That is, the information processing server 20 ends the loop process in Step S220 without executing the macro function execution instruction.

In a case where the information processing server 20 determines that the response is permission to execution (Yes in Step S222), the information processing server 20 ends the loop process in Step S220 and proceeds to the process in Step S223. The information processing server 20 requests the information processing terminal 10 to immediately execute the function execution instruction (Step S223). For example, the information processing server 20 instructs the information processing terminal 10 to make an execution request of a function execution instruction via the response control unit 270. The information processing server 20 returns the process to the loop process in Step S210. As a result, the information processing terminal 10 immediately executes the macro function execution instruction by execution by the control unit 160.

In a case where the information processing server 20 determines that there is no response to the execution confirmation (No in Step S221) and the timer has not timed out, the information processing server 20 repeats the loop process in Step S220. Furthermore, when the timer has timed out, the information processing server 20 ends the process of Step S220 and returns the process to the loop process of Step S210.

In a case where the information processing server 20 determines that the multitasking degree of the user U is not the determination threshold or less (No in Step S213), the multitasking degree is greater than the determination threshold. Accordingly, the information processing server 20 proceeds to the process of Step S230. The series of processes from Step S230 after No in Step S213 corresponds to an example of the process of delaying the execution of the element function of the macro in a case where the multitasking degree is greater than the determination threshold as described above. The information processing server 20 executes a delay loop process according to the multitasking degree (Step S230). The end condition of the delay loop process in Step S230 is the timer timeout. Having executed the delay loop process, the information processing server 20 determines whether there is a cancellation response from the user U (Step S231). For example, in a case where the information processing server 20 has received a response indicating cancellation from the information processing terminal 10 via the communication unit 280, the information processing server 20 determines that there is a cancellation response. In a case where the information processing server 20 determines that there is a cancellation response (Yes in Step S231), the information processing server 20 ends the delay loop process in Step S230 and returns the process to the loop process in Step S210. That is, the information processing server 20 ends the delay loop process in Step S230 without executing the macro function execution instruction.

In a case where the information processing server 20 determines that there is no cancellation response (No in Step S231) and the timer has not timed out, the information processing server 20 repeats the delay loop process in Step S230. Furthermore, when the timer has timed out, the information processing server 20 ends the delay loop process in Step S230 and proceeds to the process of Step S223, which has already been described. The information processing server 20 requests the information processing terminal 10 to immediately execute the function execution instruction (Step S223). The information processing server 20 returns the process to the loop process in Step S210. As a result, the information processing terminal 10 immediately executes the macro function execution instruction by execution by the control unit 160.

As described above, in a case where the information processing server 20 has recognized the phrase that triggers the execution of the macro from the user utterance UO, the information processing server 20 determines the degree of security risk $R_m$ based on the context matching rate $M_c$ and the phrase frequency $F_p$. That is, the information processing server 20 can add information regarding whether the information at the time when the user U utters the macro call phrase is suitable for executing the macro function and whether the phrase is likely to be used on a daily basis other than macro calling, to the determination. With this configuration, the information processing server 20 can immediately execute the function for the utterance made when the user U has an intention of executing the macro, and can make a confirmation to the user U whether to execute the function for the unintended utterance (false positive recognition). As a result, the information processing server 20 can suppress malfunctions without deteriorating the convenience of being able to execute macros by voice.

Furthermore, the information processing server 20 executes a process of confirming to the user U whether to execute each of the function execution instructions based on the execution risk of the function execution instructions constituting the macro. When the execution risk $R_f$ of the function execution instruction constituting the macro is greater than the execution level $L_e$, the information processing server 20 executes a process of confirming the execution of the function execution instruction to the user U. With this process, the information processing server 20 immediately executes the function execution instruction of the macro having a low execution risk $R_f$ without performing unnecessary execution confirmation for the function execution instruction. As a result, the information processing server 20 can suppress malfunctions without bothering the user U.

Furthermore, the information processing server 20 calculates the execution risk $R_f$ as the degree of disadvantage to the user U due to erroneous execution based on the functional characteristics of the macro and the status of the user U. In a case where the execution risk $R_f$ is greater than the execution level $L_e$, the information processing server 20 executes the process of making a confirmation to the user U whether to execute the macro. With this process, the information processing server 20 can preferentially confirm the execution of the macro function having a high execution risk. As a result, the information processing server 20 can suppress the degree of disadvantage to the user U due to the execution of the macro.

In addition, the information processing server 20 determines the possibility that execution of the macro function execution instruction would cancel the preceding operation of the user U. In a case where there is a possibility of canceling the operation, the information processing server 20 confirms to the user U whether to execute the macro function execution instruction. With this configuration, the information processing server 20 can avoid the unintended cancellation of the user U by confirming the execution of the function execution instruction of the macro that would cancel the operation of the user U. As a result, the information processing server 20 can further suppress the degree of disadvantage to the user U due to the execution of the macro.

The information processing server 20 calculates the degree of concentration of the user on the main task, and changes the control of confirmation of execution of the macro function execution instruction to the user in accordance with the degree of concentration. For example, the information processing server 20 delays the macro function execution instruction when the degree of concentration is higher than a first threshold. For example, the information processing server 20 confirms the execution of the macro function execution instruction when the degree of concentration of the user U is the first threshold or less. With this configuration, the information processing server 20 is capable of suppressing the obstruction to the user U who is concentrated on the main task, while capable of confirming the execution of the macro function to the user who is not concentrated on the main task. As a result, the information processing server 20 can suppress erroneous execution of the macro function without bothering the user U.

When the information processing server 20 has received a cancellation instruction from the user in a case of delaying the execution of the macro function execution instruction, the information processing server 20 cancels the execution of the function execution instruction. With this process, for example, when the user U does not remember the macro function, the information processing server 20 can give the user U time to remind the user U of the macro function. As a result, the information processing server 20 can improve the possibility of executing the macro function intended by the user U, and can contribute to the suppression of erroneous execution.

The information processing server 20 executes a macro function execution instruction when the delay time has elapsed. With this configuration, the information processing server 20 can execute the macro function that has not been canceled by the user U, enabling the information processing server 20 to further ensure the possibility of executing the macro function intended by the user U.

[Execution confirmation according to the execution risk of function execution instructions constituting the macro (1)]

Figure 7:
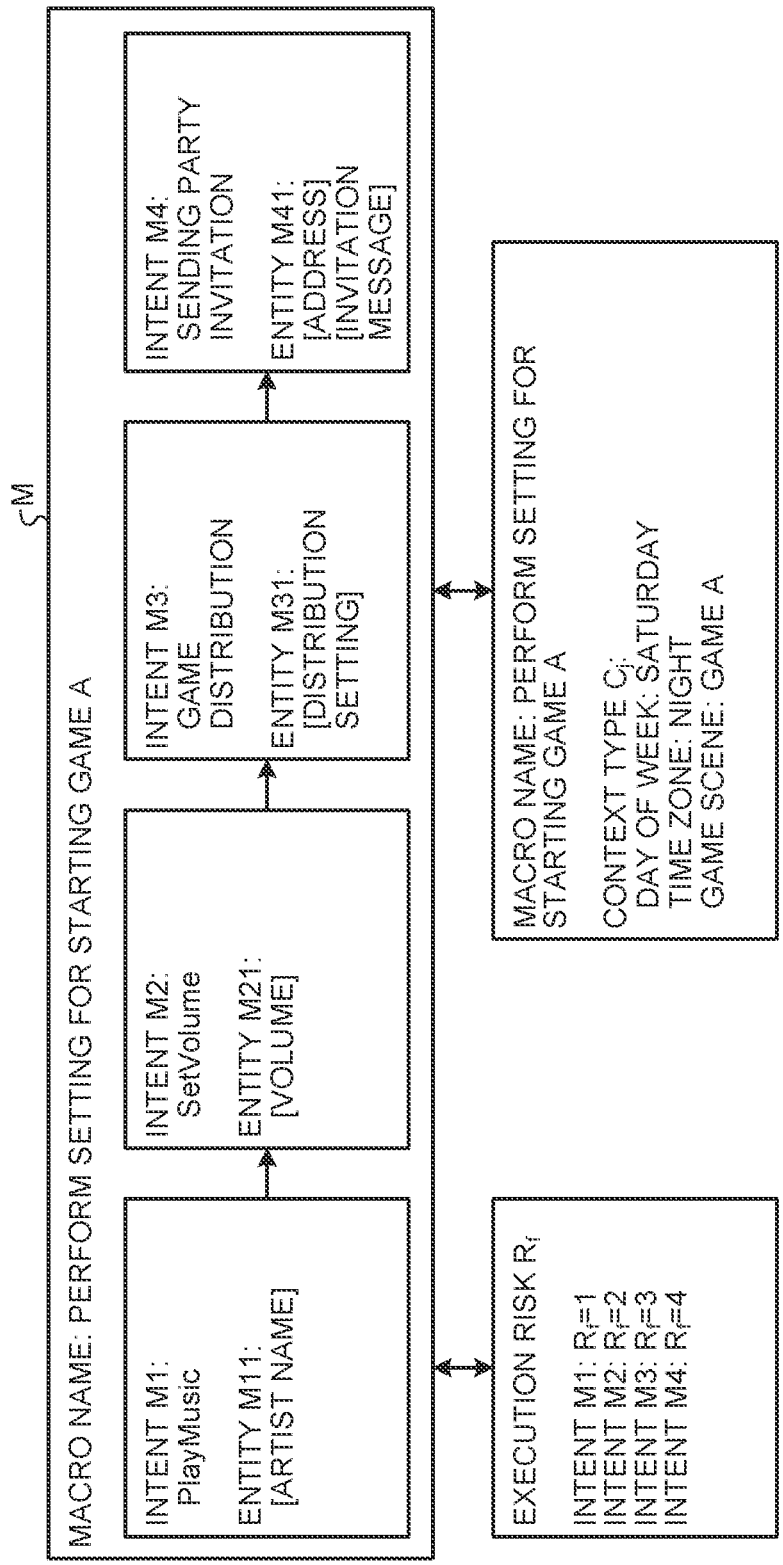
FIG. 7 is a diagram illustrating an example of a relationship between macro data, execution risk, and context type according to the present embodiment.
Figure 8:
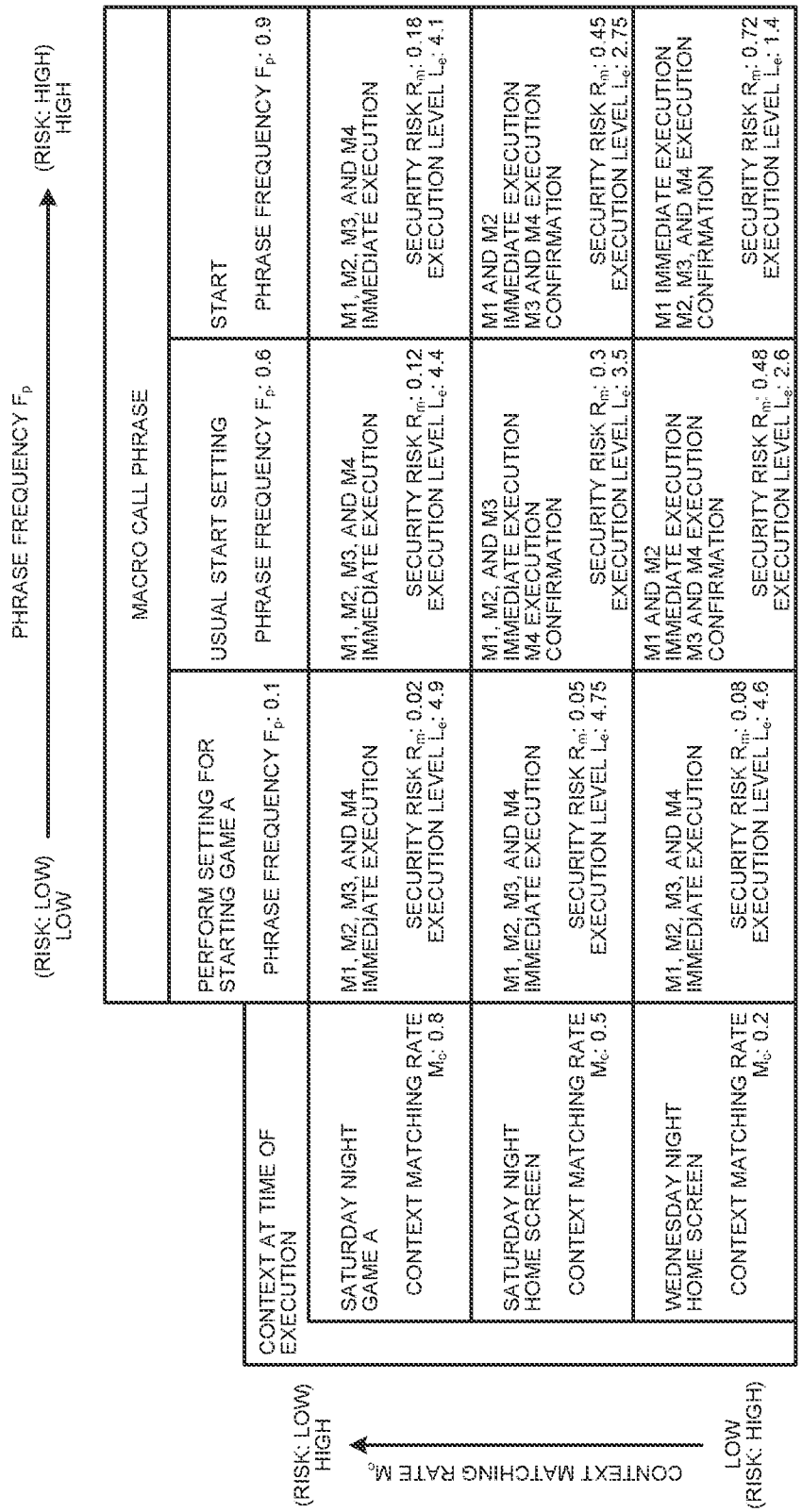
FIG. 8 is a diagram illustrating an example of a case of execution confirmation according to the macro execution risk of the present embodiment.

Next, an example of execution confirmation according to the execution risk $R_f$ of the function execution instruction constituting the macro performed by the information processing system 1 will be described with reference to FIGS. 7 and 8. FIG. 7 is a diagram illustrating an example of the relationship between the macro data M, the execution risk $R_f$, and the context type according to the present embodiment. FIG. 8 is a diagram illustrating an example of execution confirmation according to the macro execution risk of the present embodiment. FIG. 8 illustrates an example of a macro in which no cancellation element function is provided for the most recent operation.

In an example illustrated in FIG. 7, the information processing server 100 manages macro data M having a macro name "Perform setting for starting game A". In the macro data M, PlayMusic is set as intent M1. PlayMusic indicates the name of the function that plays music. In the macro data M, [Artist name] is set as entity M11 of intent M1. In the macro data M, SetVolume is set as intent M2 that comes after intent M1. SetVolume indicates the name of the function that sets the volume. In the macro data M, [Volume] is set as entity M21 of intent M2. In the macro data M, game distribution is set as intent M3 that comes after intent M2. Game distribution indicates the name of the function that distributes the game. In the macro data M, [Distribution setting] is set as entity M31 of intent M3. In the macro data M, Send party invitation is set as intent M4 that comes after intent M3. Send party invitation indicates the name of the function that sends invitations to multiplayer games. In the macro data M, [Destination] and [invitation message] are set as entity M41 of intent M4.

Execution risk $R_f$ based on the function template 261 is set in macro data M. The execution risk $R_f$ is set as $R_f=1$ for intent M1, $R_f=2$ for intent M2, $R_f=3$ for intent M3, and $R_f=4$ for intent M4. In addition, the macro data M is associated with the context type $C_j$ of the macro having a macro name "Perform setting for starting game A". Regarding the context type $C_j$, "Saturday" is set as the day of the week type, "night" is set as the time zone type, and "game A" is set as the game scene type.

Having received the utterance data D and the context C from the information processing terminal 10, the information processing server 20 analyzes the utterance data D. The information processing server 20 extracts a macro call phrase from the utterance data D and calculates the phrase frequency $F_p$. In the example illustrated in FIG. 8, in a case where the information processing server 20 has extracted "Perform setting for starting game A" as a phrase, the information processing server 20 calculates the phrase frequency $F_p$ of 0.1. For example, in a case where the information processing server 20 has extracted "Usual start setting" as a phrase, the information processing server 20 calculates a phrase frequency $F_p$ of 0.6. For example, in a case where the information processing server 20 has extracted "start" as a phrase, the information processing server 20 calculates a phrase frequency $F_p$ of 0.9. In the example illustrated in FIG. 8, the phrase frequency $F_p$ indicates that the lower the frequency, the lower the risk, and the higher the frequency, the higher the risk.

The information processing server 20 calculates the context matching rate $M_c$ based on the context C. In a case where the context C indicates that the user U is playing game A on Saturday night in the example illustrated in FIG. 8, the information processing server 20 calculates the context matching rate $M_c$ of 0.8. In a case where the context C indicates that the user A is viewing the home screen on Saturday night, for example, the information processing server 20 calculates the context matching rate $M_c$ of 0.5. In a case where the context C indicates that the user A is viewing the home screen on Wednesday night, for example, the information processing server 20 calculates the context matching rate $M_c$ of 0.2. In the example illustrated in FIG. 8, the context matching rate $M_c$ indicates that the higher the matching rate, the lower the risk, and the lower the matching rate, the higher the risk.

The information processing server 20 calculates the phrase frequency $F_p$ and the context matching rate $M_c$ for each of a plurality of macro intents, and then calculates the security risk $R_m$ and the execution level $L_e$. In the example illustrated in FIG. 8, when the phrase frequency $F_p$ is 0.1 and the context matching rate $M_c$ is 0.8, the information processing server 20 calculates the security risk $R_m$ of 0.02 and the execution level $L_e$ of 4.9. In this case, since the context matching rate $M_c$ has a low risk and the phrase frequency $F_p$ has a low risk as well, the information processing server 20 causes the information processing terminal 10 to immediately execute the intents M1, M2, M3, and M4.

Furthermore, in the example illustrated in FIG. 8, when the phrase frequency $F_p$ is 0.9 and the context matching rate $M_c$ is 0.2, the information processing server 20 calculates the security risk $R_m$ of 0.72 and the execution level $L_e$ of 1.4. In this case, since the context matching rate $M_c$ has a high risk and the phrase frequency $F_p$ has a high risk as well, the information processing server 20 additionally considers the execution risks $R_f$ for the intents M1, M2, M3, and M4. As a result, based on the execution risk $R_f$, the information processing server 20 causes the information processing terminal 10 to immediately execute intent M1 alone and confirms the execution of the intents M2, M3, and M4 to the user U.

As described above, the information processing server 20 can determine the function execution instruction (intent) of the macro to be immediately executed, based on the security risk $R_m$ obtained by combining the phrase frequency $F_p$ and the context matching rate $M_c$ illustrated in FIG. 8. The information processing server 20 performs setting such that the lower security risk $R_m$, the more the execution confirmation to user U is suppressed, and the higher the security risk $R_m$, the more the execution confirmation to user U is performed. That is, the information processing server 20 immediately executes the macro function when the user U makes an utterance intended to execute the macro, and in contrast, confirms whether to execute the macro when the utterance is not intended to execute the macro (false positive recognition), thereby suppressing erroneous execution of the macro.

[Execution Confirmation According to the Execution Risk of Macro (2)]

Figure 9:
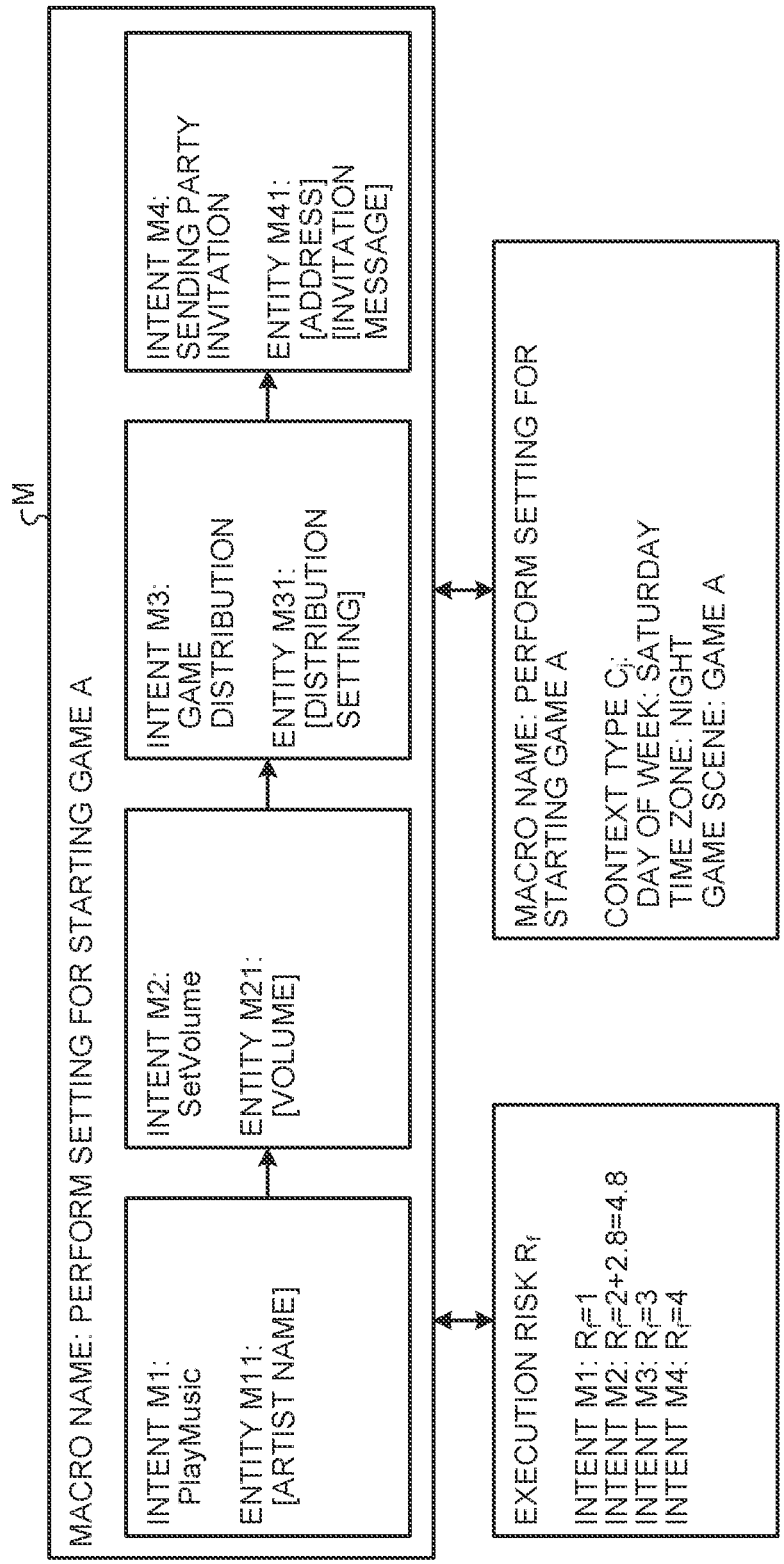
FIG. 9 is a diagram illustrating an example of a relationship between macro data, execution risk, and context type according to the present embodiment.
Figure 10:
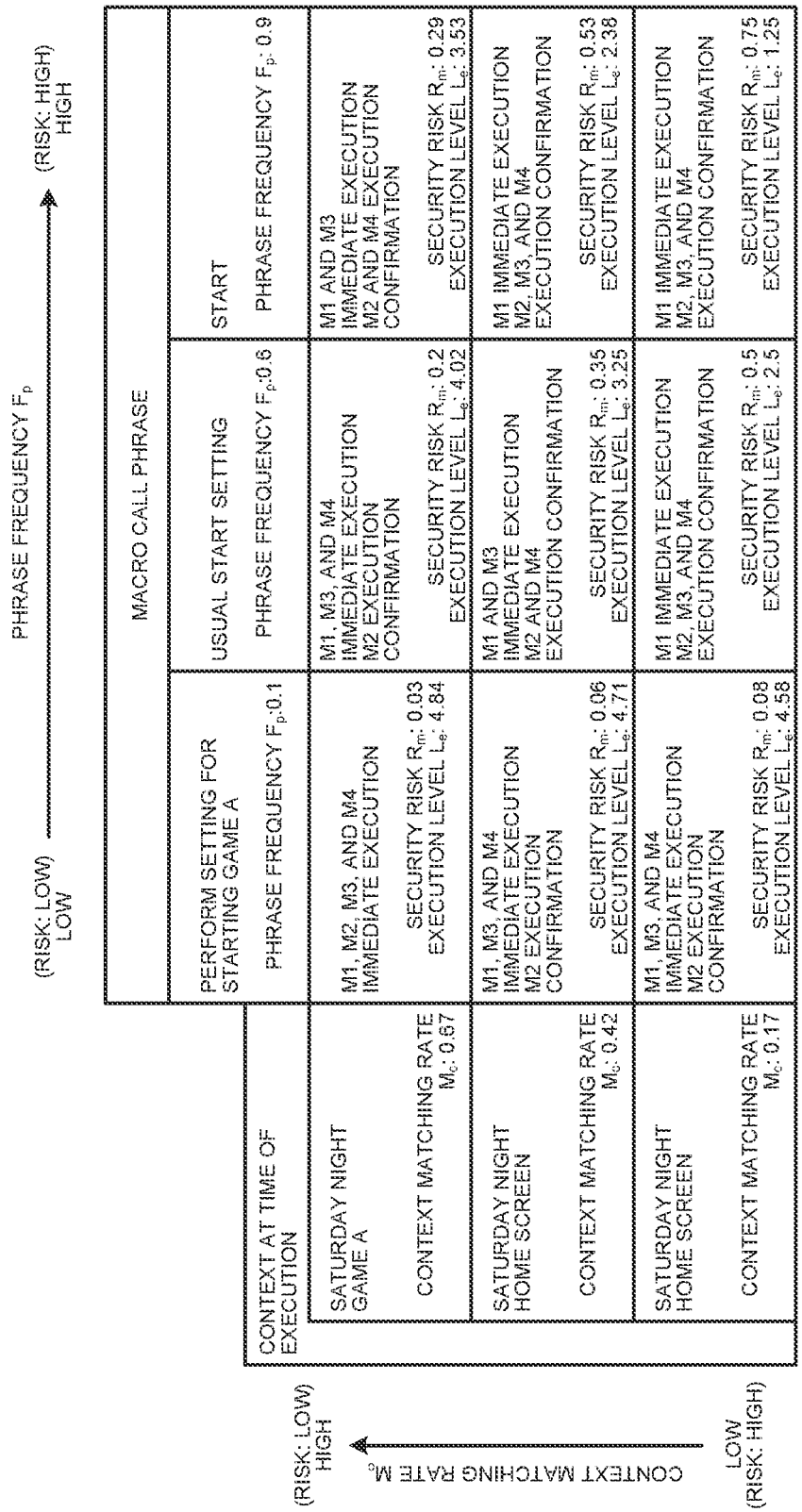
FIG. 10 is a diagram illustrating another example of a case of execution confirmation according to the macro execution risk of the present embodiment.

Next, an example of execution confirmation according to the execution risk $R_f$ of the macro performed by the information processing system 1 will be described with reference to FIGS. 9 and 10. FIG. 9 is a diagram illustrating an example of the relationship between the macro data M, the execution risk $R_f$, and the context type according to the present embodiment. FIG. 10 is a diagram illustrating another example of execution confirmation according to the macro execution risk of the present embodiment. FIG. 10 illustrates an example when the macro has an element function of canceling the most recent operation.

In the example illustrated in FIG. 9, the information processing server 100 manages the macro data M having a macro name "Perform setting for starting game A". The macro data M has the same configuration as the macro data M illustrated in FIG. 7. In the example illustrated in FIG. 9, the user U has performed volume operation, as most recent operation, on the information processing terminal 10. In this case, since the macro intent M2 is a volume setting function, execution of the function might change the volume set by the user U. In other words, execution of the macro intent M2 might cancel the user U's volume control. In consideration of this, the information processing server 100 adds a cancellation risk to the execution risk $R_f$ of the macro intent M2. In the example illustrated in FIG. 9, the information processing server 100 adds a calculated cancellation risk 2.8 to the execution risk $R_f$ of intent M12 and thereby changes the execution risk $R_f$ to 4.8. That is, the information processing server 20 sets the execution risk $R_f$ at a high level and thereby raises the priority of the process of confirming the execution of the macro intent M2 to the user.

Having received the utterance data D and the context C from the information processing terminal 10, the information processing server 20 analyzes the utterance data D. The information processing server 20 extracts a macro call phrase from the utterance data D and calculates the phrase frequency $F_p$. In the example illustrated in FIG. 10, in a case where the information processing server 20 has extracted "Perform setting for starting game A" as a phrase, the information processing server 20 calculates the phrase frequency $F_p$ of 0.1. For example, in a case where the information processing server 20 has extracted "Usual start setting" as a phrase, the information processing server 20 calculates a phrase frequency $F_p$ of 0.6. For example, in a case where the information processing server 20 has extracted "start" as a phrase, the information processing server 20 calculates a phrase frequency $F_p$ of 0.9. In the example illustrated in FIG. 10, the phrase frequency $F_p$ indicates that the lower the frequency, the lower the risk, and the higher the frequency, the higher the risk.

The information processing server 20 calculates the context matching rate $M_c$ based on the context C. In a case where the context C indicates that the user U is playing game A on Saturday night in the example illustrated in FIG. 10, the information processing server 20 calculates the context matching rate $M_c$ of 0.67. In a case where the context C indicates that the user A is viewing a home screen on Saturday night, for example, the information processing server 20 calculates the context matching rate $M_c$ of 0.42. In a case where the context C indicates that the user A is viewing the home screen on Wednesday night, for example, the information processing server 20 calculates the context matching rate $M_c$ of 0.17. In the example illustrated in FIG. 10, the context matching rate $M_c$ indicates that the higher the matching rate, the lower the risk, and the lower the matching rate, the higher the risk.

The information processing server 20 calculates the phrase frequency $F_p$ and the context matching rate $M_c$ for each of a plurality of macro intents, and then calculates the security risk $R_m$ and the execution level $L_e$. In the example illustrated in FIG. 10, when the phrase frequency $F_p$ is 0.1 and the context matching rate $M_c$ is 0.67, the information processing server 20 calculates the security risk $R_m$ of 0.03 and the execution level $L_e$ of 4.84. In this case, since the context matching rate $M_c$ has a low risk and the phrase frequency $F_p$ has a low risk as well, the information processing server 20 causes the information processing terminal 10 to immediately execute the intents M1, M2, M3, and M4.

Furthermore, in the example illustrated in FIG. 10, when the phrase frequency $F_p$ is 0.1 and the context matching rate $M_c$ is 0.42, the information processing server 20 calculates the security risk $R_m$ of 0.06 and the execution level $L_e$ of 4.71. In this case, since the context matching rate $M_c$ has a moderate degree of risk and the phrase frequency $F_p$ has a high risk, the information processing server 20 additionally considers the execution risks $R_f$ for the intents M1, M2, M3, and M4. As a result, based on the execution risk $R_f$, the information processing server 20 causes the information processing terminal 10 to immediately execute intent M1, M3, and M4 and confirms the execution of the intents M2 to the user U.

Furthermore, in the example illustrated in FIG. 8, when the phrase frequency $F_p$ is 0.9 and the context matching rate $M_c$ is 0.17, the information processing server 20 calculates the security risk $R_m$ of 0.75 and the execution level $L_e$ of 1.25. In this case, since the context matching rate $M_c$ has a high risk and the phrase frequency $F_p$ has a high risk as well, the information processing server 20 additionally considers the execution risks $R_f$ for the intents M1, M2, M3, and M4. As a result, based on the execution risk $R_f$, the information processing server 20 causes the information processing terminal 10 to immediately execute intent M1 alone and confirms the execution of the intents M2, M3, and M4 to the user U.

As described above, as illustrated in FIG. 10, in a case where the macro has an element function of canceling the most recent operation, the information processing server 20 can determine the function (intent) to be executed immediately, based on the combination of risks of the phrase frequency $F_p$ and the context matching rate $M_c$. The information processing server 20 performs setting such that the lower security risk $R_m$, the more the execution confirmation to user U is suppressed, and the higher the security risk $R_m$, the more the execution confirmation to user U is performed. Furthermore, the information processing server 20 confirms the execution of a function that might cancel the most recent operation of the user U. That is, the information processing server 20 can suppress the situation in which macro execution would cause unintended cancellation of the preceding operation.

[Hardware Configuration]

Figure 11:
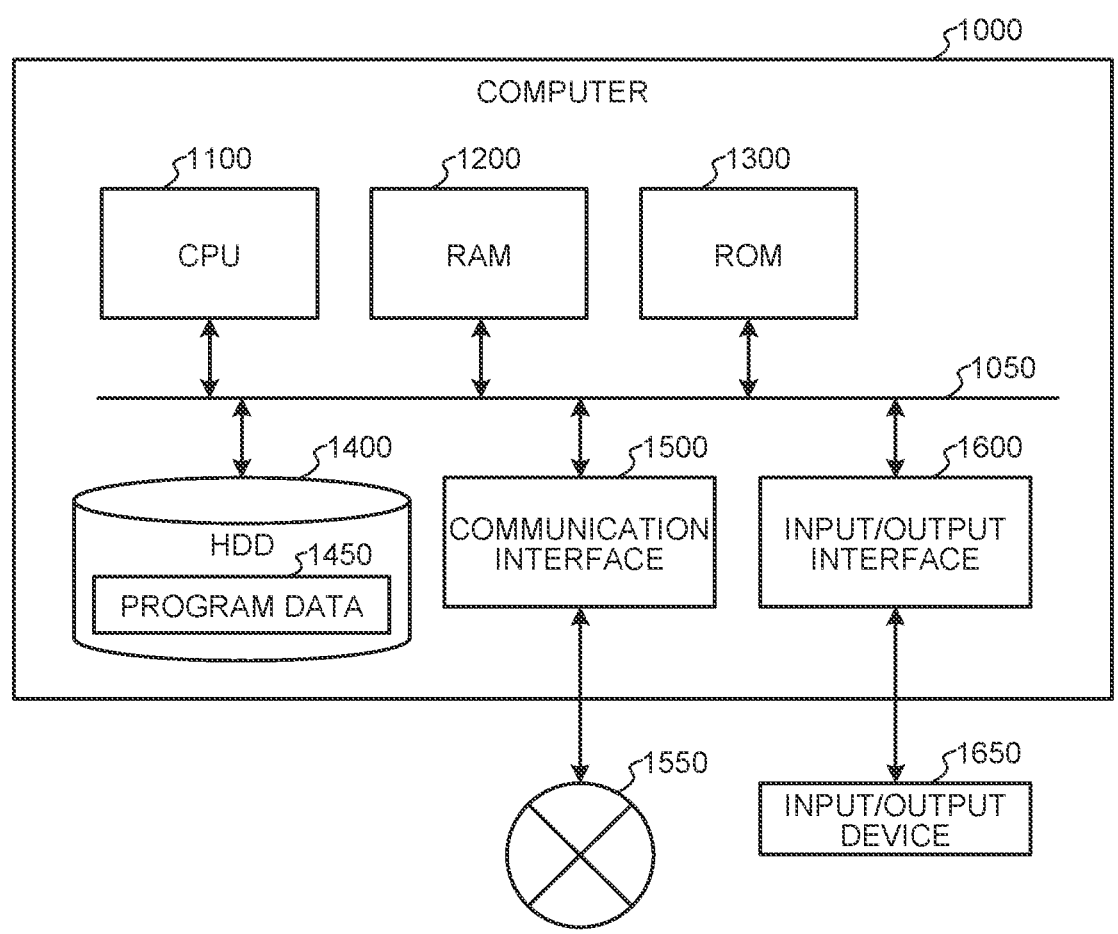
FIG. 11 is a hardware configuration diagram illustrating an example of a computer that implements functions of an information processing server.

The information devices such as the information processing server 20 and the information processing terminal 10 according to the above-described embodiment are implemented by a computer 1000 having a configuration as illustrated in FIG. 11, for example. Hereinafter, the information processing server 20 according to an embodiment will be described as an example. FIG. 11 is a hardware configuration diagram illustrating an example of the computer 1000 that implements functions of the information processing server 20. The computer 1000 includes a CPU 1100, RAM 1200, read only memory (ROM) 1300, a hard disk drive (HDD) 1400, a communication interface 1500, and an input/output interface 1600. Individual components of the computer 1000 are interconnected by a bus 1050.

The CPU 1100 operates based on a program stored in the ROM 1300 or the HDD 1400 so as to control each of components. For example, the CPU 1100 develops a program stored in the ROM 1300 or the HDD 1400 into the RAM 1200 and executes processes corresponding to various programs.

The ROM 1300 stores a boot program such as a basic input output system (BIOS) executed by the CPU 1100 when the computer 1000 starts up, a program dependent on hardware of the computer 1000, or the like.

The HDD 1400 is a non-transitory computer-readable recording medium that records a program executed by the CPU 1100, data used by the program, or the like. Specifically, the HDD 1400 is a recording medium that records an information processing program according to the present disclosure, which is an example of program data 1450.

The communication interface 1500 is an interface for connecting the computer 1000 to an external network 1550 (for example, the Internet). For example, the CPU 1100 receives data from other devices or transmits data generated by the CPU 1100 to other devices via the communication interface 1500.

The input/output interface 1600 is an interface for connecting between an input/output device 1650 and the computer 1000. For example, the CPU 1100 receives data from an input device such as a keyboard or a mouse via the input/output interface 1600. In addition, the CPU 1100 transmits data to an output device such as a display, a speaker, or a printer via the input/output interface 1600. Furthermore, the input/output interface 1600 may function as a media interface for reading a program or the like recorded on predetermined recording media. Examples of the media include optical recording media such as a digital versatile disc (DVD), a magneto-optical recording medium such as a magneto-optical disk (MO), a tape medium, a magnetic recording medium, and semiconductor memory.

For example, in a case where the computer 1000 functions as the information processing server 20 according to an embodiment, the CPU 1100 of the computer 1000 executes the information processing program loaded on the RAM 1200 and thereby implements functions of individual processing units such as the voice recognition unit 210, the semantic analysis unit 220, the image recognition unit 230, the sensor recognition unit 240, the determination unit 250, and the response control unit 270. Furthermore, the HDD 1400 stores the information processing program according to the present disclosure or data in the storage unit 260. While the CPU 1100 executes the program data 1450 read from the HDD 1400, the CPU 1100 may acquire these programs from another device via the external network 1550, as another example.

The present embodiment describe above is an exemplary case where the information processing apparatus is implemented by the information processing system 1 including the information processing terminal 10 and the information processing server 20. However, the present invention is not limited to this example. For example, the information processing apparatus may be implemented by the information processing terminal 10, and the information processing terminal 10 may have the function of the information processing server 20.

The present embodiment described above is an exemplary case where the information processing server 20 determines the degree of the security risk $R_m$ based on the context matching rate $M_c$ and the phrase frequency $F_p$. However, the present invention is not limited to this example. For example, the information processing server 20 may be configured to determine the degree of security risk $R_m$ based on the context matching rate $M_c$ alone. In this case, the information processing server 20 may set determination conditions for the context matching rate $M_c$ in the function execution instruction of the macro, and may determine whether to execute or confirm the execution of the function execution instruction. Furthermore, for example, the information processing server 20 may be configured to determine the degree of security risk $R_m$ based on the phrase frequency $F_p$ alone. In this case, the information processing server 20 may set determination conditions for the phrase frequency $F_p$ in the function execution instruction of the macro, and may determine whether to execute the function execution instruction or confirm the execution. Furthermore, the information processing server 20 may be configured to be capable of outputting at least one of the context matching rate $M_c$ or the phrase frequency $F_p$.

The present embodiment described above is an exemplary case where the control unit 160 of the information processing terminal 10 functions as an execution unit. However, the present invention is not limited to this example. For example, the response control unit of the information processing server 20 may function as the execution unit, and the execution result may be output by the information processing terminal 10.

The preferred embodiments of the present disclosure have been described in detail above with reference to the accompanying drawings, but the technical scope of the present disclosure is not limited to such examples. It is obvious that a person having ordinary knowledge in the technical field of the present disclosure can come up with various changes or modifications within the scope of the technical idea described in the claims, and these are understood, of course, to belong to the technical scope of the present disclosure.

Furthermore, the effects described in the present specification are merely illustrative or exemplary and are not limited. That is, the technique according to the present disclosure can exhibit other effects that are apparent to those skilled in the art from the description of the present specification in addition to or instead of the above effects.

It is also possible to create a program for the hardware such as CPU, ROM, and RAM built in a computer to exert the functions equivalent to the configuration of the information processing server 20, and a computer-readable recording medium that has recorded the program can also be provided.

Furthermore, individual steps related to the processing of the information processing server 20 in the present specification do not necessarily have to be processed in chronological order in the order described in the flowchart. For example, individual steps related to the processing of the information processing server 20 may be processed in an order different from the order described in the flowchart, or may be processed in parallel.

Note that the following configurations also belong to the technical scope of the present disclosure.

(1)

An information processing apparatus comprising:
a determination unit that, in a case where the determination unit has recognized a user's phrase related to execution of a macro including at least one function execution instruction, determines a degree of security risk of the macro based on at least one of a matching rate, at the time of execution of the macro, of a context indicating a status of the user, or frequency of occurrence of the phrase; and
a response control unit that changes control of the execution of the macro based on a determination result of the determination unit.

(2)

The information processing apparatus according to (1), wherein
the response control unit
controls to execute the macro in a case where the degree of security risk determined by the determination unit does not satisfy a change condition, and
executes a process of confirming execution of the macro to the user in a case where the degree of security risk determined by the determination unit satisfies the change condition.

(3)

The information processing apparatus according to (1) or (2), wherein
the determination unit calculates a degree of disadvantage to the user by execution of the function execution instruction, and then calculates a degree of execution risk of the macro based on the degree of disadvantage, and
the response control unit changes a process of confirming the execution of the macro to the user based on the execution risk.

(4)
The information processing apparatus according to (3), wherein
the response control unit performs setting such that the higher the execution risk, the higher the priority of the process of confirming the execution of the macro to the user.

(5)
The information processing apparatus according to (3) or (4), wherein
the determination unit calculates an execution level of the macro, and in a case where the execution risk is greater than the execution level, the determination unit controls to execute the process of confirming the execution of the macro to the user.

(6)
The information processing apparatus according to any one of (1) to (5), further comprising
a storage unit that stores history data indicating an operation performed by the user, wherein
the determination unit determines a possibility that execution of the function execution instruction would cancel the preceding operation executed by the user, and
in a case where there is a possibility that execution will cancel the preceding operation executed by the user, the response control unit controls to confirm execution of the function execution instruction to the user.

(7)
The information processing apparatus according to any one of (1) to (6), wherein
the determination unit calculates a degree of concentration of the user on a main task, and
the response control unit changes the control of confirmation of execution of the function execution instruction to the user in accordance with the degree of concentration.

(8)
The information processing apparatus according to (7), wherein
in a case where the degree of concentration is higher than a first threshold, the response control unit controls to delay the function execution instruction.

(9)
The information processing apparatus according to (8), wherein,
when the response control unit has received a cancellation instruction from the user in a case where the response control unit controls to delay the function execution instruction, the response control unit stops execution of the function execution instruction.

(10)
The information processing apparatus according to (8) or (9), wherein, when a delay time of the function execution instruction has elapsed, the response control unit controls to execute the function execution instruction.

(11)
The information processing apparatus according to any one of (8) to (10), wherein,
in a case where the degree of concentration is the first threshold or less, the response control unit executes the control of confirmation of execution of the function execution instruction to the user.

(12)
The information processing apparatus according to any one of (1) to (11), wherein
the determination unit calculates a matching rate between the context acquired when the user's phrase related to the execution of the macro is recognized and the context of the user associated with the macro.

(13)
The information processing apparatus according to any one of (1) to (12), wherein
the determination unit calculates a frequency of the phrase based on the past degree of occurrence of the phrase that calls the macro.

(14)
The information processing apparatus according to any one of (1) to (13), further comprising
an execution unit that executes the function execution instruction of the macro under the control of the response control unit.

(15)
An information processing method comprising executing, by a computer:
performing, when the computer has recognized a user's phrase related to execution of a macro including at least one function execution instruction, determination of a degree of security risk of the macro based on at least one of a matching rate, at the time of execution of the macro, of a context indicating a status of the user, or frequency of occurrence of the phrase; and
changing control of the execution of the macro based on a determination result obtained.

(16)
An information processing system including:
an information processing terminal; and an information processing server capable of communicating with the information processing terminal,
in which the information processing server includes:
a determination unit that, in a case where the determination unit has recognized a user's phrase related to execution of a macro including at least one function execution instruction, determines a degree of security risk of the macro, based on at least one of a matching rate, at the time of execution of the macro, of a context indicating a status of the user, or frequency of occurrence of the phrase; and
a response control unit that changes control of execution of the macro based on a determination result of the determination unit, and
the information processing terminal includes an execution unit that executes the macro under the control of the response control unit.

REFERENCE SIGNS LIST

1 INFORMATION PROCESSING SYSTEM
10 INFORMATION PROCESSING TERMINAL
20 INFORMATION PROCESSING SERVER
110 DISPLAY UNIT
120 SOUND OUTPUT UNIT
130 SOUND INPUT UNIT
140 IMAGING UNIT
150 SENSOR UNIT
160 CONTROL UNIT
170 COMMUNICATION UNIT
210 VOICE RECOGNITION UNIT
220 SEMANTIC ANALYSIS UNIT
230 IMAGE RECOGNITION UNIT
240 SENSOR RECOGNITION UNIT
250 DETERMINATION UNIT
260 STORAGE UNIT
261 FUNCTION TEMPLATE
262 HISTORY DATA
270 RESPONSE CONTROL UNIT
M MACRO DATA

The invention claimed is:

1. An information processing apparatus, comprising:
one or more processors configured to:
recognize a user's phrase related to execution of a macro including at least one function execution instruction;
acquire a context, that corresponds to at least one of a day, a time zone, a scene, a user's behavior, a location, or a user's emotion, associated with the user's phrase;
determine a degree of security risk of the macro based on at least one of a matching rate, at a time of the execution of the macro, of the acquired context indicating a status of the user, or frequency of occurrence of the user's phrase; and
change a control of the execution of the macro based on the determined degree of security risk.

2. The information processing apparatus according to claim 1, wherein the one or more processors are configured to:
execute the macro in an event, the degree of security risk unit does not satisfy a change condition, and
execute a process to confirm the execution of the macro from a user in an event, the degree of security risk satisfies the change condition.

3. The information processing apparatus according to claim 1, wherein the one or more processors are configured to:
calculate a degree of disadvantage to a user based on the execution of the function execution instruction,
calculate a degree of execution risk of the macro based on the degree of disadvantage, and
change a process to confirm the execution of the macro from the user based on the degree of execution risk.

4. The information processing apparatus according to claim 3, wherein a high value of the execution risk corresponds to a high priority of the process to confirm the execution of the macro from the user.

5. The information processing apparatus according to claim 3, wherein the one or more processors are configured to:
calculate an execution level of the macro based on the degree of security risk,
execute the process to confirm the execution of the macro from the user, in an event the calculated execution level is greater than the degree of execution risk.

6. The information processing apparatus according to claim 1, further comprising a memory configured to store history data that indicates an operation performed by a user,
wherein the one or more processors are configured to
determine a possibility that the execution of the function execution instruction would cancel the operation executed by the user, and
cancel the operation executed by the user based on the determined possibility, and,
change the control-to confirm the execution of the function execution instruction from the user.

7. The information processing apparatus according to claim 1, the one or more processors are configured to:
calculate a degree of concentration of a user on a main task, and
change the control of confirmation of the execution of the function execution instruction to the user in accordance with the degree of concentration.

8. The information processing apparatus according to claim 7, wherein in an event, the degree of concentration is higher than a first threshold, the one or more processors are configured to delay the function execution instruction.

9. The information processing apparatus according to claim 8, wherein the one or more processors are configured to stop the execution of the function execution instruction based on reception of a cancellation instruction from the user in an event the function execution instruction is delayed.

10. The information processing apparatus according to claim 8, wherein in an event, a delay time of the function execution instruction has elapsed, the one or more processors are configured to execute the function execution instruction.

11. The information processing apparatus according to claim 8, wherein in an event, the degree of concentration is equal to or less than the first threshold, the one or more processors are configured to execute the control of the confirmation of the execution of the function execution instruction from the user.

12. The information processing apparatus according to claim 1, wherein the one or more processors are configured to calculate the matching rate between the acquired context and a context of a user associated with the macro.

13. The information processing apparatus according to claim 1, wherein the one or more processors are configured to calculate a frequency of the user's phrase based on a past degree of occurrence of the user's phrase associated with the macro.

14. The information processing apparatus according to claim 1, wherein the one or more processors are configured to execute the function execution instruction of the macro based on the control.

15. A non-transitory computer-readable medium having stored thereon, computer-executable instructions which, when executed by a computer, cause the computer to execute operations, the operations comprising:
recognizing a user's phrase related to execution of a macro including at least one function execution instruction;
acquiring a context, that corresponds to at least one of a day, a time zone, a scene, a user's behavior, a location, or a user's emotion, associated with the user's phrase;
determining a degree of security risk of the macro based on at least one of a matching rate, at a time of execution of the macro, of the acquired context, or frequency of occurrence of the user's phrase; and
changing a control of the execution of the macro based on the determined degree of security risk.

16. An information processing apparatus, comprising:
one or more processors configured to:
recognize a user's phrase related to execution of a macro including at least one function execution instruction;
acquire a context, that corresponds to at least one of a day, a time zone, a scene, a user's behavior, a location, or a user's emotion, associated with the user's phrase;
determine a degree of security risk of the macro based on at least one of a matching rate, at a time of execution of the macro, of the acquired context, or frequency of occurrence of the user's phrase, wherein a control of the execution of the macro is changed based on the determined degree of security risk;

calculate a degree of disadvantage to a user based on the execution of the function execution instruction;

calculate a degree of execution risk of the macro based on the degree of disadvantage; and change a process to confirm the execution of the macro from the user based on the calculated degree of execution risk.

17. An information processing apparatus, comprising:

one or more processors; and a memory configured to store instructions, and history data that indicates an operation performed by a user, wherein the one or more processors configured to execute the instructions to:

recognize a user's phrase related to execution of a macro including at least one function execution instruction;

acquire a context, that corresponds to at least one of a day, a time zone, a scene, a user's behavior, a location, or a user's emotion, associated with the user's phrase;

determine a degree of security risk of the macro based on at least one of a matching rate, at a time of the execution of the macro, of the acquired context, or frequency of occurrence of the user's phrase; and change a control of the execution of the macro based on the determined degree of security risk, wherein the one or more processors are further configured to determine a possibility that the execution of the function execution instruction would cancel the operation executed by the user, cancel the operation executed by the user based on the determined possibility, and change the control of the execution to confirm the execution of the function execution instruction from the user.

18. An information processing apparatus, comprising:

one or more processors configured to:

recognize a user's phrase related to execution of a macro including at least one function execution instruction;

acquire a context, that corresponds to at least one of a day, a time zone, a scene, a user's behavior, a location, or a user's emotion, associated with the user's phrase;

determine a degree of security risk of the macro based on at least one of a matching rate, at a time of the execution of the macro, of the acquired context, or frequency of occurrence of the user's phrase;

calculate a degree of concentration of a user on a main task; and change a control of confirmation of the execution of the function execution instruction to the user in accordance with the degree of concentration.

* * * * *